(12) United States Patent
Ohmura et al.

(10) Patent No.: US 7,922,037 B2
(45) Date of Patent: Apr. 12, 2011

(54) DEVICE FOR MANUALLY DISPENSING MEDICATIONS

(75) Inventors: Yoshihito Ohmura, Tokyo (JP); Hideaki Hirobe, Tokyo (JP)

(73) Assignee: Tosho Inc., Tokyo (JP)

( * ) Notice: Subject to any disclaimer, the term of this patent is extended or adjusted under 35 U.S.C. 154(b) by 394 days.

(21) Appl. No.: 12/067,320

(22) PCT Filed: Dec. 18, 2006

(86) PCT No.: PCT/JP2006/325208
§ 371 (c)(1),
(2), (4) Date: Mar. 19, 2008

(87) PCT Pub. No.: WO2007/091375
PCT Pub. Date: Aug. 16, 2007

(65) Prior Publication Data
US 2009/0152291 A1 Jun. 18, 2009

(30) Foreign Application Priority Data

Feb. 10, 2006 (JP) ................................. 2006-033864
Apr. 28, 2006 (JP) ................................. 2006-124685

(51) Int. Cl.
*B65H 3/44* (2006.01)
(52) U.S. Cl. ............. 221/123; 221/3; 221/127; 221/194; 221/197; 221/274
(58) Field of Classification Search ............... 221/3, 123, 221/127, 194, 197, 274; 700/236
See application file for complete search history.

(56) References Cited

U.S. PATENT DOCUMENTS
4,036,937 A * 7/1977 Roy et al. ...................... 423/446

(Continued)

FOREIGN PATENT DOCUMENTS

| CN | 1511760 A | 7/2004 |
|---|---|---|
| JP | 03-240603 A | 10/1991 |
| JP | 03-240604 A | 10/1991 |
| JP | 2003237702 A | 8/2003 |
| JP | 2004203433 A | 7/2004 |

OTHER PUBLICATIONS

International Search Report for Corresponding Application PCT/JP2006/325208.

(Continued)

*Primary Examiner* — Timothy R Waggoner
(74) *Attorney, Agent, or Firm* — Matthew B. Dernier, Esq.; Gibson & Dernier LLP

(57) ABSTRACT

A device for manually dispensing medications is realized, which allows the operator to perform preliminary manual medication dispensing in advance of several subsequent dispensing steps, while facilitating the operator's ability to recognize the region to which each medication is to be dispensed, there by allowing the operator to easily and precisely perform manual dispensing of various kinds of medications. The device for manually dispensing medications includes: a frame member (44) which allows the operator to insert/extract a preliminary dispensing cassette (20), which is partitioned into a multitude of cells (21), via the top face thereof; a lid member (47), which is formed in the shape of a plate, that serves a lid for opening/closing the top face of the frame member, and which has a multitude of insertion openings in the form of through holes with the layout that corresponds to the layout of the cells formed in the preliminary dispensing cassette (20); a multitude of light-emitting units provided to the lid member such that they are associated with the respective insertion openings (48); a screen display unit (41) which displays the names of medications to be manually dispensed; and a control unit (42) which receives a selection with respect to the medication name, and which turns on, from among the light-emitting units (49) thus provided, the light-emitting units that belong to a region to which the medication thus selected is to be manually dispensed.

11 Claims, 10 Drawing Sheets

U.S. PATENT DOCUMENTS

| | | | | |
|---|---|---|---|---|
| 4,717,042 A | * | 1/1988 | McLaughlin | 221/3 |
| 5,408,443 A | * | 4/1995 | Weinberger | 221/3 |
| 5,954,225 A | * | 9/1999 | Powe | 221/2 |
| 6,102,855 A | * | 8/2000 | Kehr et al. | 221/289 |
| 6,625,518 B2 | * | 9/2003 | Depeursinge | 700/242 |
| 6,644,496 B1 | * | 11/2003 | Ambrosio | 221/2 |
| 7,848,846 B2 | | 12/2010 | Uema et al. | |
| 2004/0134043 A1 | | 7/2004 | Uema | |
| 2005/0145644 A1 | | 7/2005 | Mori | |

OTHER PUBLICATIONS

Written Opinion for Corresponding Application PCT/JP2006/325208.

Chinese Office Action for corresponding Chinese Patent Application No. 200680018849.5, Dec. 15, 2010.

* cited by examiner

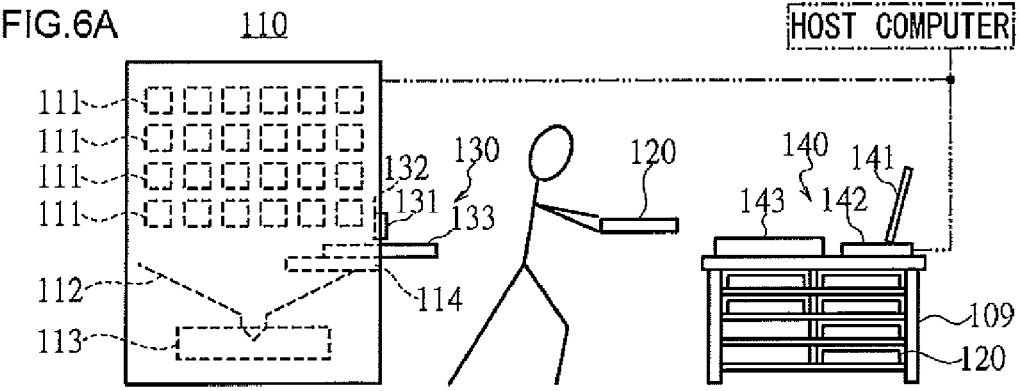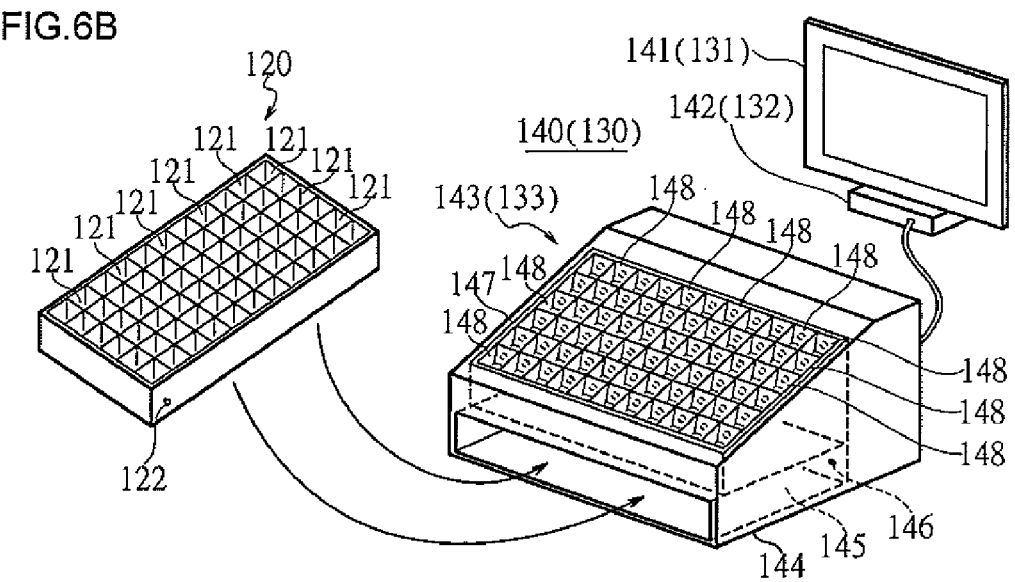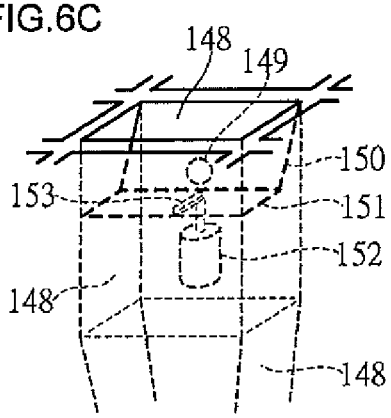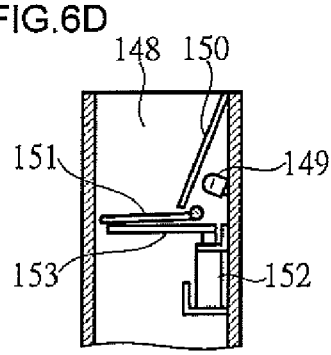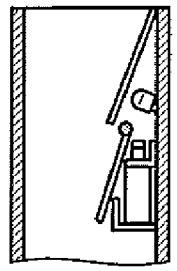

DEVICE FOR MANUALLY DISPENSING MEDICATIONS

TECHNICAL FIELD

The present invention relates to a device for manually dispensing medication which allows the operator to manually dispense medications in advance to a multitude of cells prior to automatic medication dispensing.

BACKGROUND TECHNOLOGY

Devices for manually dispensing medications have been proposed and put into practical use in the form of built-in components of medication sorting and packing apparatuses (see Patent documents 1 and 2). With such devices for manually dispensing medications, a preliminary dispensing cassette is detachably provided to a housing of the medication sorting and packing apparatus. The preliminary dispensing cassette has a cell structure in which a multitude of cells are formed such that they are horizontally and vertically aligned. Each cell (chamber) has a structure in which the top face is open, which allows medications to be inserted, and in which the bottom face/underside has a shutter mechanism or the like which provides a function of opening/closing the underside, thereby allowing the medications to be discharged. Furthermore, a delivery mechanism (conveyor) is included in the housing of the medication sorting and packing apparatus, underneath the preliminary dispensing cassette that has been inserted, and this delivery mechanism provides a function of receiving the medications discharged from the cells, and delivering the medications thus received to the packing device in increments of cells.

Furthermore, these devices for manually dispensing medications have a function of displaying the number of cells and the name of each medication. The display of the number of cells reduces the burden of the operation of the operator who has the responsibility of precisely checking the number of packs of medications. Specifically, LEDs are provided so as to provide a function of displaying a two-digit number. With such an arrangement, the number of cells are displayed. Alternatively, the number of cells horizontally and the number of cells vertically are displayed. Also, an LED is provided to each cell. With such an arrangement, the position of each cell is displayed via the light emission of the corresponding LED. Also, the LEDs are provided around the circumference of the cells. With such an arrangement, the light emission of the LEDs thus provided notifies the operator manually dispensing medications of the number of cells to be used. Furthermore, the display of each medication name is provided in the form of a printout from a printer, which at the same time also prints the reference number of the medication prescription to be dispensed manually.

[Patent Document 1]
Japanese Patent Application Laid-Open No. Hei03-240604

[Patent Document 2]
Japanese Patent Application Laid-Open No. Hei03-240603

DISCLOSURE OF THE INVENTION

Problems to be Solved by the Invention

However, such conventional devices for manually dispensing medications have problems as follows. For example, let us consider a case in which the medication prescription to be dispensed manually instructs the operator to distribute large quantities of multiple medications, and to change the region of the cells to which the medications are to be dispensed according to the kind of medication. Specifically, for example, in a case in which a certain kind of medication is to be distributed to a predetermined region of the cells, in some cases, the operator needs to determine the distribution operation with reference to the original prescription or the like.

Also, such a device for manually dispensing medications is provided in the form of a built-in component of the medicine sorting and packing apparatus. The medications that can be preliminary manual dispensed are thus limited to at most the medications for the current insertion and the subsequent insertion, which results in the operator having to wait for the dispensing process to finish before the operator can perform additional preliminary manual dispensing.

Accordingly, it is a technical purpose of the present invention to provide a device for manually dispensing medications which provides a function of allowing the operator to perform preliminary manual medication dispensing for several subsequent insertion operations, while facilitating the operator's ability to recognize the region of the cells to which the medications are to be dispensed, there by allowing the operator to easily and precisely perform manual dispensing of various kinds of medications.

Means to Solve the Problem

A device for manually dispensing medications according to an embodiment of the present invention comprises: a frame member which allows an operator to insert/extract a preliminary dispensing cassette, which is partitioned into a multitude of cells, via the top face thereof; a lid member, which is formed in the shape of a plate, that serves a lid for opening/closing the top face of the frame member, and which has a multitude of insertion openings in the form of through holes with a layout that matches a layout of the cells formed in the preliminary dispensing cassette; a multitude of light-emitting units provided to the lid member such that they are associated with the respective insertion openings; a screen display unit which displays the names of medications subject to manual operation; and a control unit which receives a selection with respect to the medication name, and which turns on, from among the light-emitting units thus provided, only the light-emitting units that belong to a region to which the medication thus selected is to be manually dispensed.

With such a device for manually dispensing medications, an arrangement may be made in which a multitude of switch members are provided to the lid member such that they are associated with the respective insertion openings. With such an arrangement, the control unit may change the light-emission state of the light-emitting units according to an operation being performed on the switch members.

A device for manually dispensing medications according to another embodiment of the present invention has a configuration in which a multitude of light-emitting units and switch members are provided such that they are respectively associated with a multitude of cells formed in a preliminary dispensing cassette. With such an arrangement, the light-emitting units are turned on in a region to which a medication is to be manually dispensed subject to manual operation. Furthermore, the light-emission state of the light-emitting units is changed according to an operation being performed on the switch members.

A device for manually dispensing medications according to yet another embodiment of the present invention comprises: a frame member which allows an operator to insert/ extract a preliminary dispensing cassette, which is partitioned into a multitude of cells, via the front face thereof or the like; a part for manually dispensing medications which is provided in the form of a built-in member of the top face of the frame member or in the form of a lid that allows the operator to open/close the top face of the frame member, and which has a multitude of cell through holes in the form of through holes formed with a layout that matches the layout of the cells provided to the preliminary dispensing cassette; a multitude of open/closed switching members which are respectively provided with in the cell through holes; and an open/closed switching driving means which drives the open/closed switching members independently of one another.

The device for manually dispensing medications may further comprise a control unit configured to receive a selection of a targeted medication to be manually dispensed, and also configured such that when a medication is transferred downward from the part for manually dispensing medications, the open/closed switching members are opened for only the region to which the medication thus selected is to be manually dispensed.

Also, the light-emitting units may be respectively provided to and associated with the cell through holes. With such an arrangement, when the control unit prompts the operator to manually dispense the medication to the part for manually dispensing medications, the control unit may turn on, from among the light-emitting units thus provided, the light-emitting units that belong to the region to which the medication thus selected is to be manually dispensed.

The device for manually dispensing medications may further comprise: a multitude of light-emitting units which are respectively provided to, and are associated with, the cell through holes; and a control unit configured to receive a selection of a targeted medication to be manually dispensed, and also configured to turn on, from among the light-emitting units thus provided, the light-emitting units that belong to the region to which the medication thus selected is to be manually dispensed.

Also, the device for manually dispensing medications may further comprise a screen display unit which displays the names of medications to be manually dispensed. With such an arrangement, the control unit may receive a selection made based upon the display provided by the screen display unit as a selection of the medication to be manually dispensed.

Also, the open/closed switching driving means may include driving sources which are respectively provided in the form of separate components to the cell through holes.

Advantage of the Present Invention

The present invention provides a device for manually dispensing medications which allows the operator to easily and precisely dispense various kinds of medications manually.

BRIEF DESCRIPTION OF THE DRAWINGS

FIG. 1 shows a mechanical configuration of the device for manually dispensing medications with respect to a specific example 1-1 according to a first embodiment of the present invention, wherein

FIG. 2 shows the functions etc., of the device for manually dispensing medications according to the first embodiment, wherein

FIG. 4 is an enlarged view which shows the principal components of the lid member with respect to a specific example 1-2 according to the first embodiment of the present invention, such as the insertion opening, the light-emitting unit, etc., wherein

FIG. 6 shows a mechanical configuration of a device for manually dispensing medications with respect to a specific example 2-1 according to a second embodiment of the present invention, wherein FIG. 6A is a schematic front view which shows a medication sorting and packing system including a built-in device for manually dispensing medications and a stand alone device for manually dispensing medications, FIG. 6B is a perspective view which shows a preliminary dispensing cassette and the device for manually dispensing medications, FIG. 6C is a perspective view which shows a cell through hole formed in a part for manually dispensing medications provided to a frame member of a main unit of the device for manually dispensing medications, and FIGS. 6D and 6E are longitudinal cross-sectional views which show the cell through hole.

FIG. 7 shows the functions etc., of the device for manually dispensing medications according to the second embodiment, wherein

DESCRIPTION OF THE REFERENCE NUMERALS

Figure 1A:
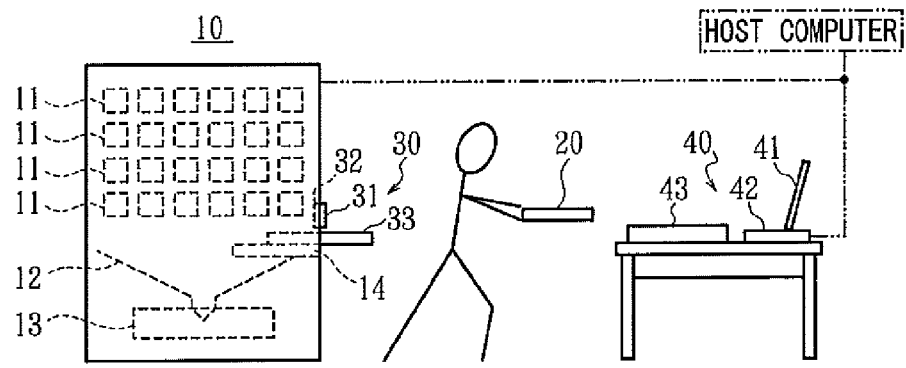
FIG. 1A is a schematic front view which shows a medication sorting and packing system including a built-in device for manually dispensing medications and a stand alone device for manually dispensing medications.

10 medication sorting and packing apparatus, 11 medication feeder, 12 medication collecting mechanism, 13 packing device, 14 delivery mechanism, 20 preliminary dispensing cassette, 21 cell, 22 information medium, 30 device for manually dispensing medications (built-in type), 31 touch panel (screen display unit, operating unit), 32 controller (control unit, procedure information processing unit), 33 main unit, 40 device for manually dispensing medications (stand alone type), 41 touch panel (screen display unit, operating unit), 42 controller (control unit, procedure information processing unit), 43 main unit, 44 frame member, 45 cassette storage space, 46 information readout device, 47 lid member, 48 insertion opening, 49 light-emitting unit, 50 switching member, 101, 102 medication, 109 work desk (storage rack), 110 medication packing device, 111 medication feeder, 112 medication collecting mechanism, 113 packing device, 114 delivery mechanism, 120 preliminary dispensing cassette, 121 cell, 122 information medium, 130 device for manually dispensing medications (built-in type), 131 touch panel (screen display unit, operating unit), 132 controller (control unit, procedure information processing unit), 133 main unit, 140 device for manually dispensing medications (stand alone type), 141 touch panel (screen display unit, operating unit), 142 controller (control unit, procedure information processing unit), 143 main unit, 144 frame member, 145 cassette storage space, 146 information readout device, 147 part for manually dispensing medications, 148 cell through hole, 149 light-emitting unit, 150 inclined plate, 151 open/closed switching member, 152 driving source (open/closed switching driving means), 153 supporting member

BEST MODE FOR CARRYING OUT THE INVENTION

First Embodiment

First, description will be made regarding the outline of a device for manually dispensing medications according to a first embodiment of the present invention.

A first device for manually dispensing medications according to a first embodiment comprises: a frame member which allows an operator to insert/extract a preliminary dispensing cassette, which is partitioned into a multitude of cells, via the top face thereof; a lid member, which is formed in the shape of a plate, that serves a lid for opening/closing the top face of the frame member, and which has a multitude of insertion openings in the form of through holes with a layout that matches a layout of the cells formed in the preliminary dispensing cassette; a multitude of light-emitting units provided to the lid member such that they are associated with the respective insertion openings; a screen display unit which displays the names of medications subject to manual operation; and a control unit which receives a selection with respect to the medication name, and which turns on, from among the light-emitting units thus provided, only the light-emitting units that belong to a region to which the medication thus selected is to be manually dispensed.

A second device for manually dispensing medications according to the first embodiment has a configuration in which a multitude of switch members (each of which is provided in the form of a built-in component of the light-emitting unit, or in the form of a separate component from the light-emitting unit) are provided to the lid member such that they are associated with the respective insertion openings. With such an arrangement, the control unit changes the light-emission state of the light-emitting units according to an operation being performed on the switch members.

A third device for manually dispensing medications according to the first embodiment has a configuration in which a multitude of combinations of a light-emitting unit and switch member (each combination is provided in the form of a single integrated component, or in the form of separate components) are provided such that they are respectively associated with a multitude of cells formed in a preliminary dispensing cassette. With such an arrangement, the light-emitting units are turned on in a region to which a medication is to be manually dispensed subject to manual operation. Furthermore, the light-emission state of the light-emitting units is changed according to an operation being performed on the switch members.

With the first device for manually dispensing medications, the preliminary dispensing cassette is provided in the form of a component separate from the main unit, there by allowing the operator to detachably mount the preliminary dispensing cassette to the main unit. Accordingly, the operator can prepare a greater number of preliminary dispensing cassettes than there are main units. Such an arrangement allows the operator to dispense multiple medications in advance according to the number of preliminary dispensing cassettes thus prepared.

Furthermore, the main unit includes the frame member and the lid member, and is configured such that a combination of the insertion opening and the light-emitting unit is provided such that it is associated with each of the cells when the lid member is closed after the preliminary dispensing cassette is temporarily stored in the frame. In this state, when the operator selects a medication candidate to be manually dispensed, based upon the medication names displayed on the screen according to a procedure for manually dispensing medications, the region to which the medication thus selected is to be manually dispensed is indicated by light-emission performed in increments of cells. Such an arrangement allows the operator to immediately recognize the region to which each medication is to be manually dispensed, even though each preliminary dispensing cassette is detachably mounted to the main unit.

Such an arrangement realizes a device for manually dispensing medications which allows the operator to perform preliminary manual medication dispensing for several subsequent dispensing steps, while facilitating the operator's ability to recognize the region to which each medication is to be dispensed, thereby allowing the operator to easily and precisely perform manual dispensing of various kinds of medications.

The second device for manually dispensing medications has the following function in addition to the aforementioned functions. That is to say, the second device for manually dispensing medications includes the switch members which are associated with the insertion openings of the cells. With such an arrangement, the light-emission state is changed according to an operation being performed on the switch members. When the switch members are operated as the operator inserts medication, the progress of the manual medication dispensing is indicated by the light-emission state of the cells which are the medication insertion destinations. Thus, such an arrangement allows the operator to visually recognize the progress of the manual medication dispensing in increments of cells. Furthermore, such an arrangement can provide automatic check processing which checks the progress of the manual medication dispensing with reference to the medication dispensing information.

The third device for manually dispensing medications includes a multitude of light-emitting units in a layout that corresponds to the layout of the cells. With such an arrangement, the light-emitting units are turned on in a region to which the medication is to be manually dispensed according to the procedure for manually dispensing medications, thereby allowing the operator to immediately recognize the region to which the medication is to be manually dispensed. Furthermore, a multitude of switch members are provided in a layout that corresponds to the layout of the cells. With such an arrangement, the light-emission state of the light-emitting units is changed as appropriate according to an operation being performed on the switch members. Thus, such an arrangement allows the operator to easily changes the light-emission state by operating each switch when the medication is inserted. This allows the progress of the manual medication dispensing to be visually recognized by the operator, and to be automatically checked.

Description will be made regarding specific arrangements for realizing a device for manually dispensing medications according to a first embodiment of the present invention with reference to the following specific examples 1-1 through 1-3.

The specific example 1-1 shown in FIGS. 1 through 3 is a specific example of the aforementioned first device for manually dispensing medications. The specific example 1-2 shown in FIG. 4 is a specific example of the aforementioned second and third devices for manually dispensing medications. The specific example 1-3 shown in FIG. 5 is a modification thereof.

It should be noted that for simplification of explanation the drawings mainly show the components necessary for or related to explanation of the invention, and the fastening members such as bolts etc., the connection members such as hinges etc., the driving sources such as electric motors etc., the transmission members such as timing belts etc., the electric circuits such as motor drivers, etc., are not shown in the drawings.

SPECIFIC EXAMPLE 1-1

Figure 1B:
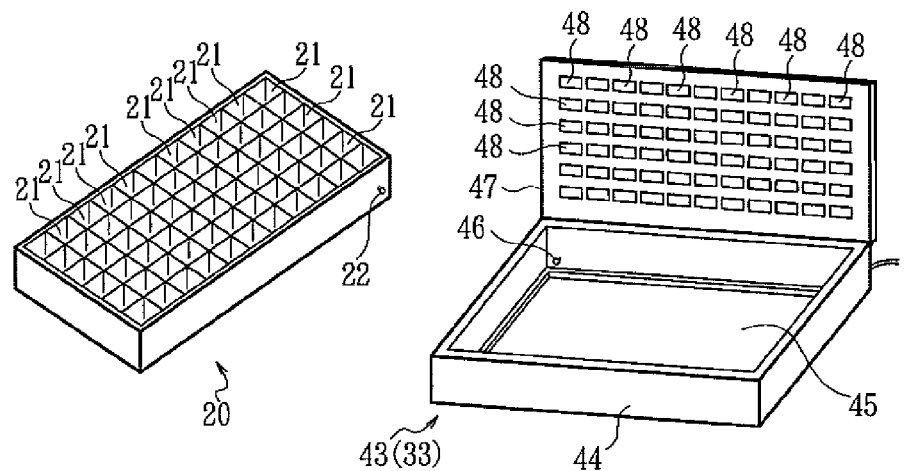
FIG. 1B is a perspective view which shows a preliminary dispensing cassette and a main unit of the device for manually dispensing medications.
Figure 1C:
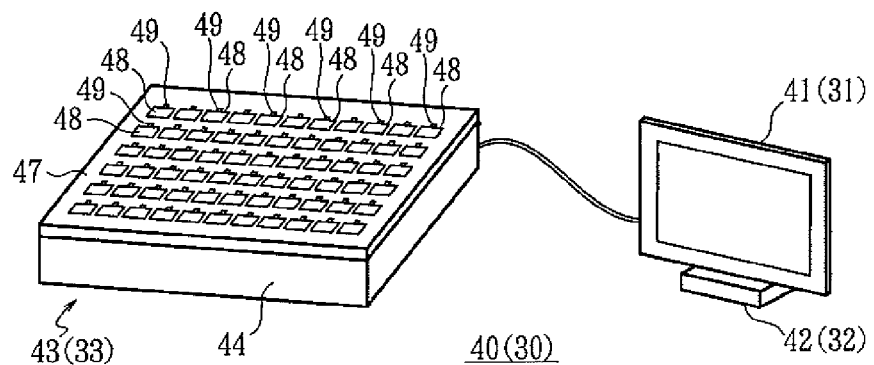
FIG. 1C is a perspective view which shows the device for manually dispensing medications.
Figure 2A:
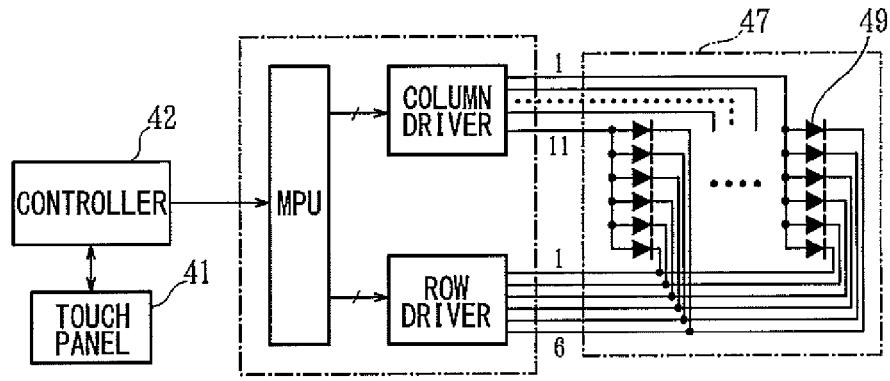
FIG. 2A is a block diagram which shows an electronic circuit thereof.
Figure 2B:
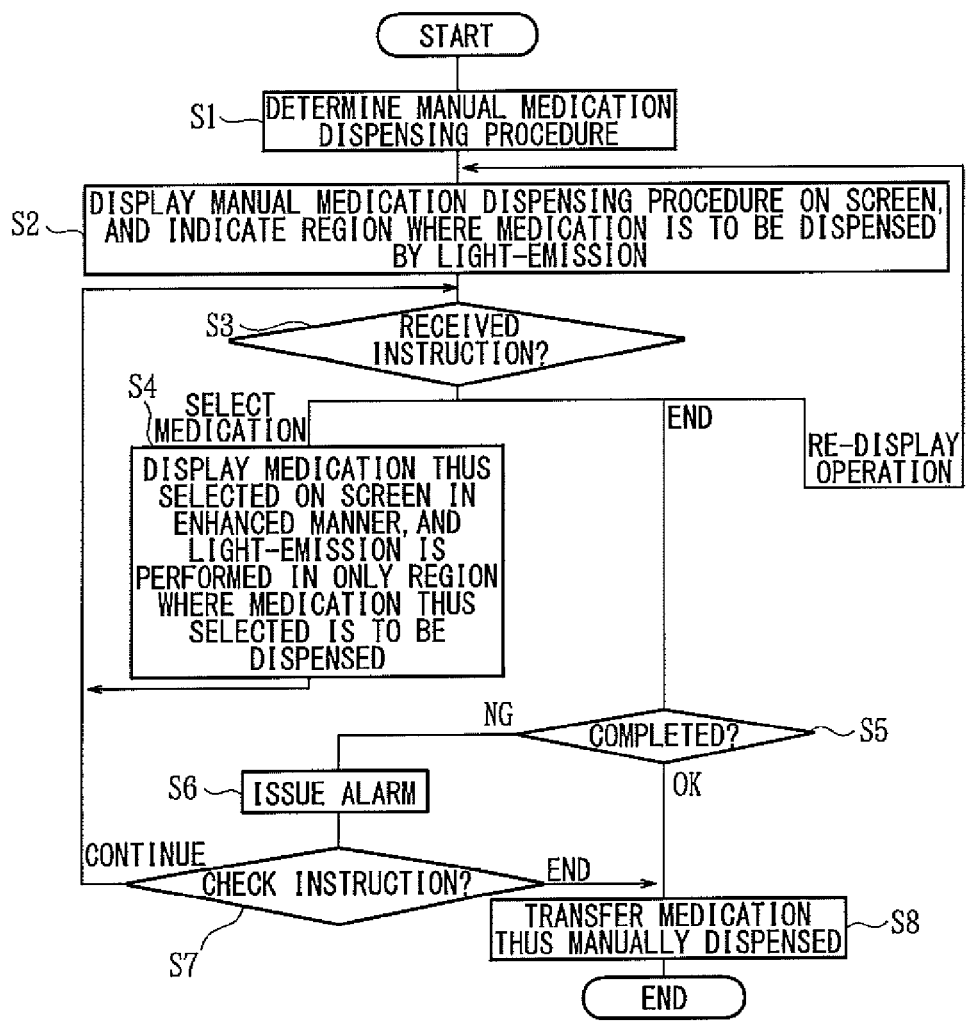
FIG. 2B is a schematic flowchart which shows the control operation thereof.

Description will be made regarding a specific configuration of the specific example 1-1 of the device for manually dispensing medications according to the present invention with reference to the drawings. FIG. 1 shows a mechanical configuration of the device for manually dispensing medications. Specifically, FIG. 1A is a schematic front view which shows a medication sorting and packing system including a built-in device for manually dispensing medications 30 and a stand alone device for manually dispensing medications 40. FIG. 1B is a perspective view which shows a preliminary dispensing cassette 20 and a main unit 43 (33) of the device for manually dispensing medications 40 (30). FIG. 1C is a perspective view which shows the device for manually dispensing medications 40 (30). On the other hand, FIG. 2 shows the functions etc., of the device for manually dispensing medications. Specifically, FIG. 2A is a block diagram which shows an electronic circuit thereof. FIG. 2B is a schematic flowchart which shows the control operation thereof.

The pharmacy system (see FIG. 1A) employs the built-in device for manually dispensing medications 30 and the stand alone device for manually dispensing medications 40. Each of these devices for manually dispensing medications has a function of receiving prescription information (dispensing instruction data). Here, the built-in device for manually dispensing medications 30 is provided in the form of a built-in component of the medication sorting and packing apparatus 10 in the same way as that of conventional arrangements. On the other hand, the stand alone device for manually dispensing medications 40 is provided in the form of a separate device installed on a desk or the like. For example, in order to allow medications to be automatically discharged and to be automatically sorted and packed, the medication sorting and packing apparatus 10, which is a solid medication sorting and packing machine or a powdered/solid medication sorting and packing apparatus, includes in the housing thereof: a multitude of medication feeders 11 which store various kinds of medications and which sequentially discharge these medications as necessary; a medication collecting mechanism 12 which collects the medications discharged and dropped from the medication feeders 11; a packing device 13 which packs the collected medications in packing paper; a delivery mechanism 14 which receives the medications discharged from the device for manually dispensing medications 30 and which delivers the medications to the sorting and packing apparatus 13 via the medication collecting mechanism 12 in increments of cells. The delivery mechanism 14 has a configuration including a combination of conveyers having different feeding directions (see Patent documents 1 and 2, for example), which is disposed underneath the device for manually dispensing medications 30.

The device for manually dispensing medications 30 (see FIG. 1A) includes a main unit 33 which is capable of detachably mounting the preliminary dispensing cassette 20; a touch panel 31 which serves as an image display unit and operating unit; and a controller 32 which serves as a control unit. The main unit 33 is mounted to the medication sorting and packing apparatus 10 through drawing rails or the like. This allows the operator to extract the main unit 33 from the housing of the medication sorting and packing apparatus 10, and to insert the main unit 33 into the housing thereof. In the state in which the main unit 33 is inserted into the housing of the medication sorting and packing apparatus 10, the main unit 33 is positioned above the delivery mechanism 14. The controller 32 is provided within the housing of the medication sorting and packing apparatus 10. The touch panel 31 is provided on the front face of the housing of the medication sorting and packing apparatus 10.

Similarly, the device for manually dispensing medications 40 includes: a main unit 43 which detachably mounts the preliminary dispensing cassette 20; a touch panel 41 which serves as an image display unit and an operating unit; and a controller 42 which serves as a controller 42. The device for manually dispensing medications 40 is configured such that it can be installed on a desk or the like.

The configurations of the devices for manually dispensing medications 30 and 40 may be the same, except for the difference according to their respective types, i.e., the built-in type or the stand alone type.

The preliminary dispensing cassette 20 (see FIG. 1B) has a structure that allows the operator to detachably mount it to either the devices for manually dispensing medications 30 or 40, and that allows the operator to separate it from the devices for manually dispensing medications 30 and 40. Furthermore, the preliminary dispensing cassette 20 is partitioned so as to have a multitude of cells 21 in the form of a 6×11 matrix, for example. Each cell has a structure in which the top face is open, which allows medications to be inserted, and the bottom face/underside has a shutter mechanism or the like which provides a function of opening/closing the underside, thereby allowing the medications to be discharged. With such an arrangement, the undersides of the cells 21 are opened all at once or sequentially, in combination with the operation of the delivery mechanism 14. An information medium 22 is attached to the preliminary dispensing cassette 20, which notifies the operator of the medications to be manually dispensed to the cells 21, etc. Specifically, the information medium 22 is provided in the form of a barcode label that specifies the identification number of the medication prescription to be dispensed manually or in the form of a data carrier which stores the content of the medication prescription to be dispensed manually.

The main unit 43 (see FIG. 1B) of the device for manually dispensing medications 40 has the same structure as that of the main unit 33 of the device for manually dispensing medications 30, which allows the operator to open/close a lid member 47 provided to a frame member 44 through a hinge or the like.

The frame member 44 is provided in the form of a frame which surrounds a cassette storage space 45 that is capable of completely storing the preliminary dispensing cassette 20. The frame member 44 has an upper face that is sufficiently open so as to allow the operator to insert/extract the preliminary dispensing cassette 20 via the upper face. On the other hand, the frame member 44 has a closed underside or an underside having an open are a that is smaller than that of the upper face, thereby supporting the preliminary dispensing cassette 20 stored in the cassette storage space 45. The frame member 44 may have such an open underside as an option. On the other hand, the frame member of the main unit 33 of the device for manually dispensing medications 30 must have an open underside structure, which is not an option. The frame 44 includes an information readout device 46, which accesses the information medium 22, at a position that faces the information medium 22 when the preliminary dispensing cassette 20 is stored in the frame member 44. Examples of the devices employed as the information readout device 46 include: a barcode reader and/or barcode writer; a data access device; etc.

The lid member 47 (see FIG. 1B and FIG. 1C) is formed in the shape of a plate which allows the upper face of the frame 44 to be opened and closed. A multitude of insertion openings 48 are provided to the lid member 47 in the form of through holes configured in the same layout as that of the cells formed in the preliminary dispensing cassette 20. When the lid member 47 is closed after the preliminary dispensing cassette 20 is stored within the frame member 44, each cell 21 is positioned underneath a corresponding insertion opening 48. The lid member 47 having such a structure includes a multitude of light-emitting units 49 (see FIG. 1C) on the upper face thereof. Each light-emitting unit 49 comprises an LED (light-emitting diode) which can be independently turned on. The light-emitting units 49 are provided such that they are each associated with a respective insertion opening 48.

The touch panel 41 may be a general-purpose touch panel having a configuration in which an input unit is provided to a liquid crystal panel. The touch panel 41 serves as a screen display unit having a function of displaying the name of each medication and the quantity of solid medication according to the medication prescription to be dispensed manually. Also, the touch panel 41 serves as an operating unit which allows the operator to select a medication via the touch panel 41 from among the medication names thus displayed.

The controller 42 comprises a programmable microprocessor system, for example. Upon reception of the content of the medication prescription to be dispensed manually from a host computer or the like, the controller 42 instructs the touch panel 41 to display the name of the medication and the quantity of solid medication to be dispensed as specified by the medication prescription to be dispensed manually. Furthermore, when the operator performs a selection operation at the portion of the touch panel 41 at which the medication name is displayed, the controller 42 receives the selection information that corresponds to this portion of the touch panel 41. Also, the controller 42 may instruct a lower microprocessor (MPU), a row driver, a column driver, etc., to perform a dynamic driving operation in a time-sharing manner. Such an arrangement allows a desired light-emission unit 49 from among the multitude of light-emission units 49 to be turned on.

The light-emission units 49 can be turned on over the entire region where the medications are to be distributed according to the medication prescription to be dispensed manually. Also, the light-emission units 49 can be turned on according to the selection of the medication name, only over the region to which the selected medication is to be dispensed. Accordingly, the program for the controller 42 provides the following instructions (see FIG. 2B). That is to say, upon reception of prescription data from the host computer, for example, the controller 42 queries the medication sorting and packing apparatus 10 with regard to whether or not each medication to be dispensed is stored in the medication sorting and packing apparatus 10, and the controller 42 determines the manual medication dispensing procedure (Step S1). Then, the controller 42 displays the content of the manual medication dispensing procedure on the screen of the touch panel 41, and turns on the light-emission units 49 that correspond to the region where the medications are to be distributed (Step S2). In this stage, the medication name and the quantity of solid medication are displayed on the screen for each of the medications specified in the procedure for manually dispensing medications. The light-emission units 49 are turned on over the entire region where at least one kind of medication is to be manually dispensed. On the other hand, the light-emission units 49 that belong to the other region are turned off.

Next, the controller 42 waits for the operator's instruction operation to be performed via the touch panel 41 or the like (Step S3). Upon reception of the instruction to select a medication (Step S4), the medication name of the medication thus selected is highlighted on the touch panel 41, as reversed-out text, for example, and the region where the light-emission units 49 are turned on is limited to a region where the medication thus selected is to be dispensed, whereupon the flow returns to the processing in which the controller 52 waits for an instruction (Step S3). It should be noted that, upon reception of a re-display instruction in the step in which the control unit 42 waits for an instruction, the control unit 42 turns on the light-emission units 49 again over the entire region where medication is to be manually dispensed. On the other hand, upon reception of an instruction to end the process in the step in which the control unit 42 waits for an instruction (Step S5), the controller 42 checks whether or not all the medications specified in the procedure for manually dispensing medications have been selected. In a case in which there is medication that has not been selected (in a case of "NG" in Step S5), the controller 42 issues an alarm (Step S6), which allows the operator manually dispensing medications to determine whether or not the process should be ended (Step S7). Upon reception of an instruction to continue the process, the flow returns to the processing in which the controller 42 waits for an instruction (Step S3). On the other hand, in a case in which the controller 42 has received an instruction to end the process (in a case of "END" in Step S7), or in a case in which determination has been made that all the medications have been selected (in a case of "OK" in Step S5), the controller 42 transmits the identification number and/or the content of the procedure for manually dispensing medications to the information medium 22 (Step S8).

Description will be made regarding the uses and the operations of the devices for manually dispensing medications 30 and 40 according to the specific example 1-1 with reference to the drawings. FIG. 1A shows a stage in which the operator preliminarily manually dispenses medications using the medication sorting and packing apparatus 10 including the built-in device for manually dispensing medications 30 and the stand alone device for manually dispensing medications 40. FIG. 1B shows the device for manually dispensing medications 40 in the state in which the lid thereof is open. FIG. C shows the device for manually dispensing medications 40 in the state in which the lid thereof is closed. Each of FIGS. 3A through 3D shows the illumination display using the light-emission units 49 provided to the lid member 47 and the screen display on the touch panel 41.

First, description will be made regarding the outline of the process initially performed according to several procedures for manually dispensing medications (see FIG. 1A). Next, description will be made regarding the process according to a medication prescription to be dispensed manually that specifies large quantities of multiple medications (see FIG. 1B, FIG. 1C, and FIG. 3).

First, let us say that each medication feeder 11 has been replenished with the corresponding medication, and the medication sorting and packing apparatus 10 is ready to dispense medications automatically. Furthermore, let us say that prescriptions have been received by the host computer, and that a part of these prescriptions specifies medications that are not stored in any medication feeder 11. These prescriptions are transmitted from the host computer to the medication sorting and packing apparatus 10. The part of the prescriptions that specifies medications that are not stored in any medication feeder 11 is extracted as a procedure for manually dispensing medications by the host computer or the medication sorting and packing apparatus 10. The procedure for manually dispensing medications thus extracted is also transmitted to the device for manually dispensing medications 40. Such an arrangement allows the operator to perform the manual medication dispensing operation using either the device for manually dispensing medications 30 or 40. When the operator starts the process of dispensing medications manually using one device for manually dispensing medications selected from among the dispensing devices 30 and 40, the procedure for manually dispensing medications is discarded for the device for manually dispensing medications that has not been selected for use by the operator. This avoids duplication in the procedure for manually dispensing medications.

In a typical operation procedure, the operator performs the manual medication dispensing operation according to the first procedure for manually dispensing medications using the device for manually dispensing medications 30 included in the medication sorting and packing apparatus 10. After all the medications have been sent to the delivery member 14 or the like according to the first procedure for manually dispensing medications, the operator performs a manual medication dispensing operation according to the second procedure for manually dispensing medications using the device for manually dispensing medications 30 in the same way as with the first procedure for manually dispensing medications. In this stage, the device for manually dispensing medications 30 is busy until the medication sorting and packing apparatus 10 performs automatic medication dispensing according to the first and second procedures for manually dispensing medications. Accordingly, the operator performs the procedures for manually dispensing medications according to the third and subsequent procedures for manually dispensing medications using the device for manually dispensing medications 40. Before the operator performs the manual medication dispensing operation using the device for manually dispensing medications 40, the operator must replace the preliminary dispensing cassette 20 in increments of completed procedures. The preliminary dispensing cassette 20 that has been subjected to the preliminary manual medication dispensing is kept as appropriate, until the operator can mount the preliminary dispensing cassette 20 to the medication sorting and packing apparatus 10.

Upon reception of a request from the medication sorting and packing apparatus 10 to perform the next manual medication dispensing operation, the operator extracts the used preliminary dispensing cassette 20 from the device for manually dispensing medications 30, and replaces it with a new preliminary dispensing cassette 20 to which medications have been manually dispensed. In this stage, the procedure for manually dispensing medications is checked using the information medium 22. If the procedure for manually dispensing medications matches the information specified in the information medium 22, the medication sorting and packing apparatus 10 immediately performs automatic medication dispensing. On the other hand, if the procedure for manually dispensing medications does not match the information specified in the information medium 22, before the medication sorting and packing apparatus 10 performs automatic medication dispensing, the medication sorting and packing apparatus 10 changes the order of the process for manually dispensing medications that is to be performed according to the prescription (see Patent document 2, for example).

Thus, such an arrangement allows the operator to perform preliminary manual medication dispensing operations according to the procedures for manually dispensing medications, even if there are multiple procedures for manually dispensing medications. Such an arrangement reduces the idle time of the medication sorting and packing apparatus 10 to approximately zero.

Next, let us say that, in at least one from among the manual medication dispensing operations, the corresponding procedure for manually dispensing medications specifies large quantities of multiple medications (see FIGS. 1B and 1C, and FIG. 3). In this case, such an arrangement allows the operator to perform the same operations as described above, except for the operation of extracting/inserting the main unit 33. Description will be made below regarding the operations.

Figure 3A:
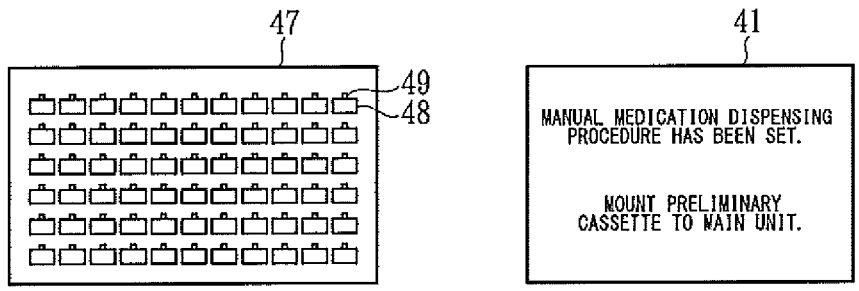
FIG. 3 shows the operation stages of the device for manually dispensing medications according to the first embodiment, wherein each of FIGS. 3A through 3D shows an example of the light-emission display and the screen display.
Figure 4A:
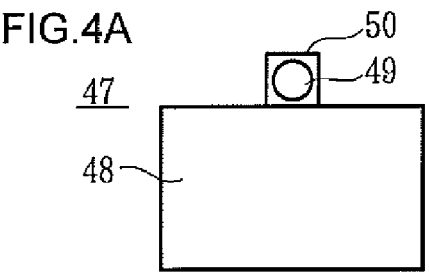
FIG. 4A is a plan view thereof.
Figure 4B:
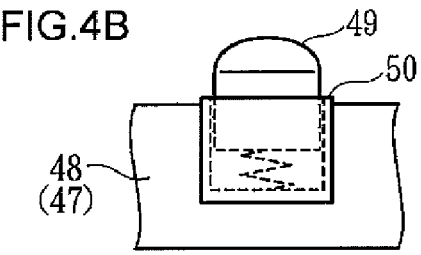
FIGS. 4B through 4G are front views thereof.

First, a guide screen is displayed on the touch panel 41, which prompts the operator to perform the manual medication dispensing operation (see FIG. 3A). According to this instruction, the operator manually dispensing medications prepares an empty preliminary dispensing cassette 20. Furthermore, the operator opens the lid member 47 of the main unit 43 of the device for manually dispensing medications 40 (see FIG. 1B). After inserting the preliminary dispensing cassette 20 into the main unit 43, the operator closes the lid member 47 (see FIG. 1C).

Figure 3B:
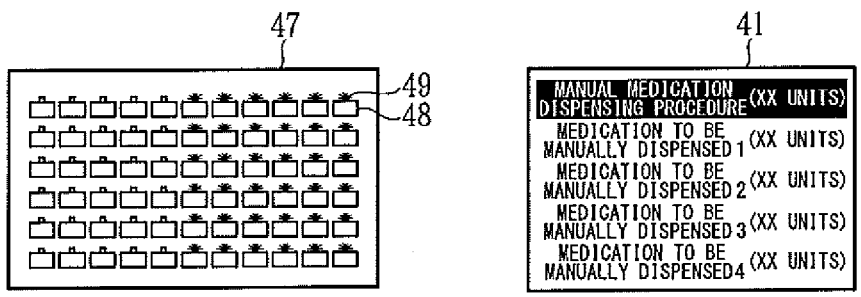
Figure 3C:
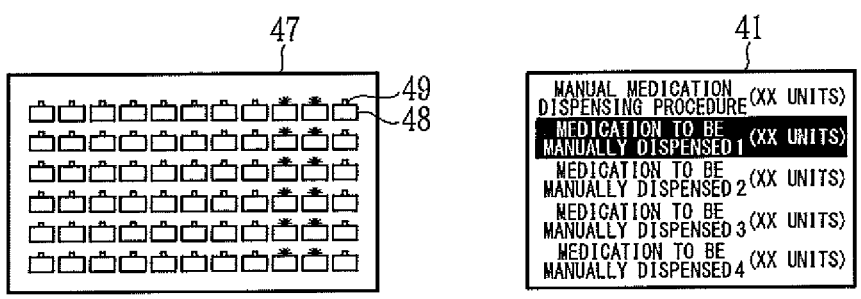

Subsequently, the device for manually dispensing medications 40 automatically displays the content of the procedure for manually dispensing medications on the screen of the touch panel 41 (see FIG. 3B). First, the device for manually dispensing medications 40 displays the identification information with regard to the procedure for manually dispensing medications, the total quantity of solid medication to be distributed, etc., in a highlighted manner using black-and-white reversed-out text or colored text. On the other hand, the device for manually dispensing medications 40 displays the name of each medication and the quantity of each medication to be dispensed in a normal display manner. Furthermore, the light-emission units 49 of the lid member 47 are turned on over the region where at least one kind of medication is to be dispensed (6×6 matrix on the right side in FIG. 3B). In this stage, when the operator manually dispensing medications selects via the touch panel 41 the medication 1 to be manually dispensed, the highlighted area is moved to the area where the medication name thus selected and the quantity there of to be dispensed are displayed (see FIG. 3C). At the same time, the light emission of the light-emitting units 49 is limited to the area to which the medication thus selected is to be dispensed (the second and third rows from the right side, each of which corresponds to six cells, in FIG. 3C). The operator manually dispensing medications inserts the medication 1, which is to be manually dispensed, in to each cell 21 via the corresponding insertion opening 48 while observing the light-emission.

Figure 3D:
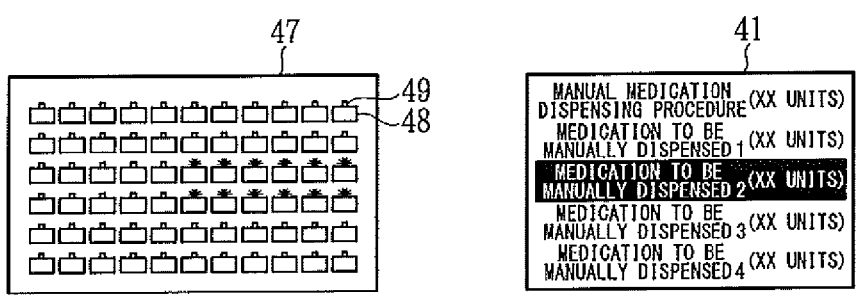

Subsequently, when the operator manually dispensing medications selects via the touch panel 41 the medication 2 to be manually dispensed, the highlighted area is moved to the area where the medication name thus selected and the quantity thereof to be dispensed are displayed (see FIG. 3D). At the same time, the light emission of the light-emitting units 49 is limited to the area to which the medication thus selected is to be dispensed (the third and fourth lines, each of which corresponds to six cells starting from the right side, in FIG. 3D). The operator manually dispensing medications inserts the medication 2, which is to be manually dispensed, into each cell 21 via the corresponding insertion opening 48 while observing the light-emission.

With such an arrangement, the operator repeatedly performs the above-described operations, thereby allowing the operator to easily manually distribute each medication with high precision.

On the other hand, in a case in which the operator instructs the device for manually dispensing medicine 40 to perform the re-display operation, the state of the screen display of the touch panel 41 and the light emission of the light-emitting units 49 is returned to the initial state. That is to say, the light-emitting units 49 are turned on over the entire area where medication is to be dispensed, thereby allowing the operator to easily recognize the entire area where medication is to be dispensed. Also, in a case in which the operator instructs the device for manually dispensing medications 40 to end the process before all the medications are dispensed, the device for manually dispensing medications 40 issues an alarm and requests that the operator check this instruction. Such an arrangement prevents the omission of each step in the manual medication dispensing operation.

Upon completion of the manual medication dispensing operation according to a procedure for manually dispensing medications, the device for manually dispensing medications 40 writes the information with respect to the procedure for manually dispensing medications to the information medium 22 of the preliminary dispensing cassette 20, whereupon the preliminary dispensing cassette 20 enters the state which permits the operator to extract it from the device for manually dispensing medications 40.

SPECIFIC EXAMPLE 1-2

Description will be made regarding a specific configuration of a specific example 1-2 of the device for manually dispensing medications according to the present invention with reference to the drawings. FIG. 4 is an enlarged view which shows the principal components of the lid member 47, such as the insertion opening 48, the light-emitting unit 49, etc. Specifically, FIG. 4A is a plan view thereof, and FIGS. 4B through 4G are front views thereof. The difference between this device for manually dispensing medications and the devices for manually dispensing medications 30 and 40 according to the specific example 1-1 described above is as follows. First, this device for manually dispensing medications has the lid member 47 including a multitude of switch members 50 disposed such that they are associated with respective insertion openings 48. Second, with this device for manually dispensing medications, the controller 42, which is a control unit, switches the light-emission state of each switch unit 50 as appropriate according to the operator's operation performed on the switch unit 50.

Specifically, the light-emitting units 49 are arranged on the lid member 47, and each light-emitting unit 49 is mounted through a switch member 50 provided beside the corresponding insertion opening 48. With such an arrangement, when the light-emitting unit 49 is depressed, the switch member 50 is turned on. On the other hand, when the pushing force thus applied to the light-emitting unit 49 is released, the light-emitting unit 49 moves upward, where upon the light-emission state thereof is returned to the OFF state.

Furthermore, the controller 42 receives the ON/OFF state of each switch member 50 as an input signal. When a desired switch member 50 is turned on, the controller 42 determines that the operator has inserted a medication 8 via the insertion opening 48 that corresponds to the switch member 50. In this case, when the operator is required to perform additional insertion of medication, the controller 42 blinks the corresponding light-emitting unit 49. On the other hand, when there is no need to insert medication, the controller 42 turns off the light-emitting unit 49.

Figure 4C:
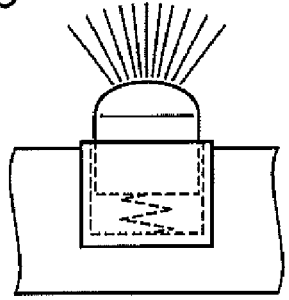
Figure 4D:
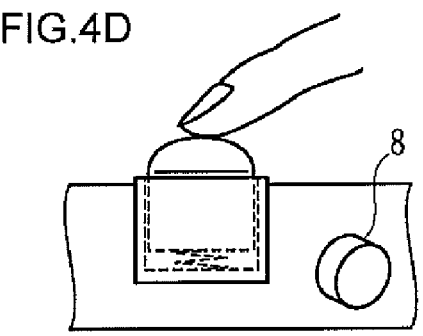
Figure 4E:
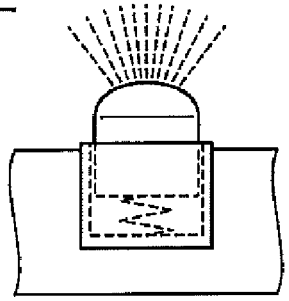
Figure 4F:
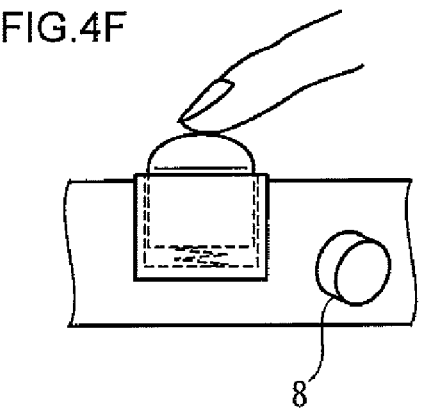
Figure 4G:
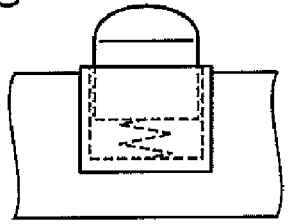
Figure 5:
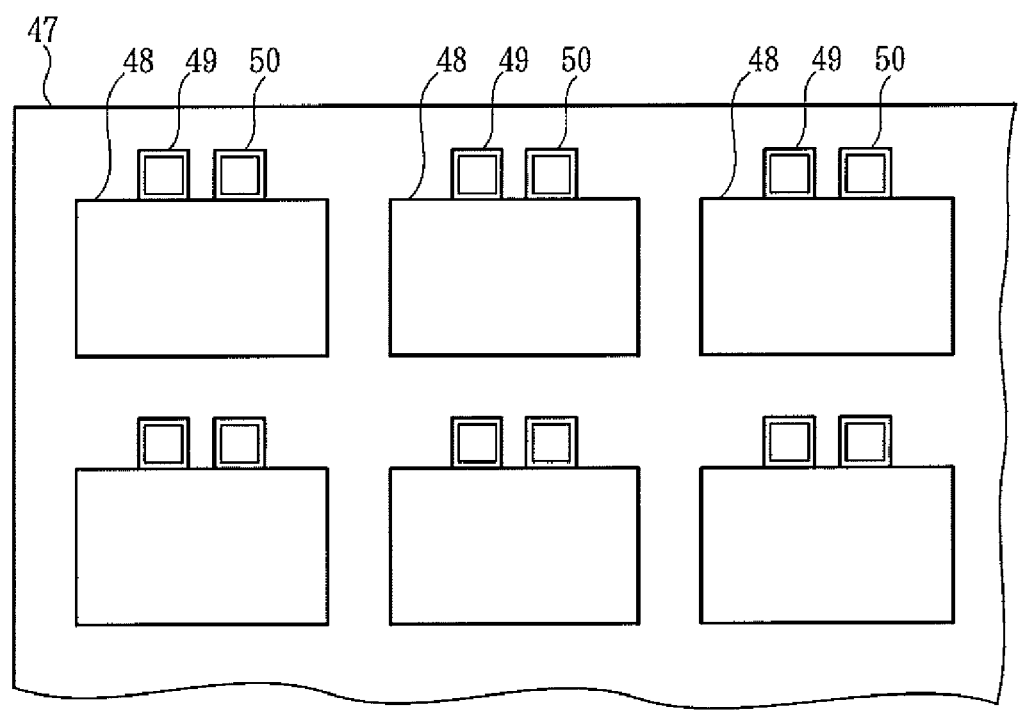
FIG. 5 is an enlarged plan view which shows the principal components of the lid member with respect to a specific example 1-3 according to the first embodiment of the present invention, such as the insertion opening, the light-emitting unit, etc.

With such an arrangement, first, the light-emitting units 49 provided to the respective insertion openings 48 are turned on over the region where the medication is to be dispensed, in the same way as in the specific example 1-1 (see FIG. 4C). When the operator pushes the light-emitting unit 49 at the same time as inserting the medication 8 (see FIG. 4D), the light-emission state of the light-emitting unit 49 is switched to a blinking state, which prompts the operator to perform additional insertion of medication (see FIG. 4E). When the operator pushes the light-emitting unit 49 again at the same time as inserting the additional medication 8 (see FIG. 4F), the light-emitting unit 49 provided on the lid member 47 of the device for manually dispensing medications 40 is turned off, which notifies the operator that the insertion of medication has been completed (see FIG. 4G).

Thus, such an arrangement allows the operator to easily and precisely perform manual dispensing of medications even if there is a need to insert two units of a single medication 8 via a single insertion opening 48. Also, such an arrangement allows the operator to easily and precisely perform the manual dispensing of medications by repeatedly checking the light-emission state, inserting the medication, and performing the switching operation, even if there is a need to insert three or more units of a single medication 8 via a single insertion opening 48.

SPECIFIC EXAMPLE 1-3

Description will be made regarding a specific configuration of a specific example 1-3 of the device for manually dispensing medications according to the present invention with reference to the drawings. FIG. 5 is an enlarged plan view which shows the principal components of the lid member 47, such as the insertion opening 48, the light-emitting unit 49, etc.

The difference between this device for manually dispensing medications and the devices for manually dispensing medications 30 and 40 according to the specific example 1-2 described above is as follows. That is to say, in the specific example 1-2, the light-emitting unit 49 and the switch member 50, which form a combination, are provided in the form of a single unit. On the other hand, in the specific example 1-3, the light-emitting unit 49 and the switch member 50, which form a combination, are provided in the form of adjacently disposed separate units.

With such an arrangement, the light-emitting unit 49 and the switch member 50, which are thus provided in the form of separate units, are disposed such that they are associated with the corresponding insertion opening 48. Thus, such an arrangement provides the same operations as those of the specific example 1-2, thereby providing the same advantages.

Other

Description has been made regarding an arrangement in which the touch panels 31 and 41 are employed, each of which has a configuration in which the screen display unit and the operating unit are integrated. Also, an arrangement may be made in which the screen display unit and the operating unit are provided in the form of separate units. For example, the screen display unit and the operating unit may be provided in the form of a display, a keyboard, and a mouse. Also, the control unit is not restricted to a microprocessor. The control unit may comprise a so-called notebook-sized personal computer having a configuration in which the screen display unit and the operating unit are integrated. Also, the control unit may comprises a so-called desktop computer having a configuration in which the screen display unit and the operating unit are provided as separate units.

Also, various kinds of switch such as an electrostatic capacitor switch etc., may be employed as the switch member 50, in addition to the mechanical switch shown in the drawings.

Second Embodiment

The second embodiment according to the present invention relates to a device for manually dispensing medications which allows the operator to dispense medications to a multitude of cells before an automatic medication dispensing operation.

Background Technique Relate to the Second Embodiment

Devices for manually dispensing medications have been proposed and put into practical use in the form of built-in components of medication sorting and packing apparatuses (see Patent documents 1 and 2). With such devices for manually dispensing medications, a preliminary dispensing cassette is detachably provided to a housing of the medication sorting and packing apparatus. The preliminary dispensing cassette has a cell structure in which a multitude of cells are formed such that they are horizontally and vertically aligned. Each cell (chamber) has a structure in which the top face is open, which allows medications to be inserted, and in which the bottom face/underside has a shutter mechanism or the like which provides a function of opening/closing the underside, thereby allowing the medications to be discharged. Furthermore, a delivery mechanism (conveyor) is included in the housing of the medication sorting and packing apparatus, underneath the preliminary dispensing cassette that has been inserted, and this delivery mechanism provides a function of receiving the medications discharged from the cells, and delivering the medications thus received to the packing device in increments of cells. Such an arrangement provides the automatic medication discharge operation regardless of whether the medication is inserted manually or automatically. Furthermore, such an arrangement provides a function of switching the state of the underside of the preliminary dispensing cassette between the open state and the closed state all at once over the entire region thereof according to an operation performed via a shutter lever, for example. This allows the solid medication stored in each cell formed in the preliminary dispensing cassette to be transferred all at once to the corresponding cell formed in the delivery member. The preliminary dispensing cassette includes no driving source such as a motor etc.

Furthermore, these devices for manually dispensing medications have a function of displaying the number of cells and the name of each medication. The display of the number of cells reduces the burden of the operation of the operator who has the responsibility of precisely checking the number of medication packs (see patent document 1). Specifically, LEDs are provided so as to provide a function of displaying a two-digit number. With such an arrangement, the number of cells are displayed. Alternatively, the number of cells horizontally and the number of cells vertically are displayed. Also, an LED is provided to each cell. With such an arrangement, the position of each cell is displayed via the light emission of the corresponding LED. Also, the LEDs are provided around the circumference of the cells. With such an arrangement, the light emission of the LEDs thus provided notifies the operator manually dispensing medications of the number of cells to be used. In addition to the display of the number of such cells, such an arrangement notifies the operator whether or not the operator needs to perform the manual medication dispensing operation twice. Furthermore, the display of each medication name is provided in the form of a printout from a printer, which at the same time also prints the identification number of the medication prescription to be dispensed manually.

Problems to be Solved by the Second Embodiment

However, such a conventional device for manually dispensing medications is provided in the form of a built-in component of the medication sorting and packing apparatus. Accordingly, the medications that can be preliminary manual dispensed are thus limited to at most the medications for the current insertion and the subsequent insertion, which results in the operator having to wait for the dispensing process to finish before the operator can perform additional preliminary manual dispensing.

Accordingly, it is a first technical purpose of the present embodiment to provide a device for manually dispensing medications which allows the operator to perform manual medication dispensing for additional insertion operations following the subsequent insertion.

Furthermore, with conventional arrangements, in a case in which the procedure for manually dispensing medications specifies large quantities of multiple medications, the medications are sequentially distributed in increments of kinds of medications. However, these medications thus sequentially distributed are mixed together in each cell formed in the preliminary dispensing cassette. This leads to difficulty in visually discriminating between the medication dispensed in the first dispensing step and the medications dispensed in the subsequent dispensing step.

Accordingly, it is a second technical purpose of the present embodiment to provide a device for manually dispensing medications which allows the operator to perform manual medication dispensing in increments of the kinds of medications, while allowing the operator to immediately visually discriminate between the medication dispensed in the first dispensing step and the medications dispensed in the subsequent dispensing step.

Furthermore, with the above-described conventional devices for manually dispensing medications, the medications thus manually dispensed are transferred all at once. This means that the medications thus manually dispensed are transferred for each cell regardless of whether or not each medication has been dispensed to the correct region to which the medication was to be dispensed. In some cases, the operator makes an error in dispensing the medication, leading to a state in which the region to which the medication has been dispensed does not match the correct region to which the medication was to be dispensed. In order to prevent the incidence of undesired situations due to such a state, the operator manually dispensing medications must carefully perform his/her operations. This leads to an increased burden on the operator due to his/her responsibility for performing such operations.

Accordingly, it is a third technical purpose of the present embodiment to provide a device for manually dispensing medications which has a function whereby, in a case in which a medication has been erroneously dispensed to an undesired region outside the correct region to which the medication was to be dispensed, the medication thus incorrectly dispensed is not transferred, and is retained in the device for manually dispensing medications.

Furthermore, let us consider a case in which the procedure for manually dispensing medications specifies large quantities of multiple medications, and the region of the cells to which the medication is to be dispensed is to be changed according to the kind of medication. In this case, with the above-described conventional device for manually dispensing medications, if a medication is to be dispensed to only a part of the cells, for example, in some cases, the operator manually dispensing medications must determine the region to which the medication is to be dispensed with reference to the original prescription or the like.

Accordingly, it is a fourth technical purpose of the present embodiment to provide a device for manually dispensing medications which allows the operator to easily and precisely dispense each medication while facilitating the operator's ability to recognize the region of the cells to which the medications are to be dispensed.

Specific Examples of the Second Embodiments

First, description will be made regarding the outline of a device for manually dispensing medications according to a second embodiment of the present invention.

A first device for manually dispensing medications according to the second embodiment has been proposed in order to contribute to a solution of the third technical problems, in addition to the solution of the aforementioned first and second technical problems. Specifically, the first device for manually dispensing medications comprises: a frame member which allows an operator to insert/extract a preliminary dispensing cassette, which is partitioned into a multitude of cells, via the front face thereof or the like; a part for manually dispensing medications which is provided in the form of a built-in member of the top face of the frame member or in the form of a lid that allows the operator to open/close the top face of the frame member, and which has a multitude of cell through holes in the form of through holes formed with a layout that matches the layout of the cells provided to the preliminary dispensing cassette; a multitude of open/closed switching members which are respectively provided within the cell through holes; and an open/closed switching driving means which drives the open/closed switching members independently of one another.

A second device for manually dispensing medications according to the second embodiment has been proposed in order to contribute to a solution of all the aforementioned first through third technical problems. Specifically, the second device for manually dispensing medications relates to the aforementioned first device for manually dispensing medications. The second device for manually dispensing medications further comprises a control unit configured to receive a selection of a targeted medication to be manually dispensed, and also configured such that when a medication is transferred downward from the part for manually dispensing medications, the open/closed switching members are opened for only the region to which the medication thus selected is to be manually dispensed.

A third device for manually dispensing medications according to the second embodiment has been proposed in order to contribute to a solution of all the aforementioned first through fourth technical problems. Specifically, the third device for manually dispensing medications relates to the aforementioned second device for manually dispensing medications. With such an arrangement, the light-emitting units are respectively provided to and associated with the cell through holes. When the control unit prompts the operator to manually dispense the medication to the part for manually dispensing medications, the control unit turns on, from among the light-emitting units thus provided, the light-emitting units that belong to the region to which the medication thus selected is to be manually dispensed.

A fourth device for manually dispensing medications according to the second embodiment has a specific component which contributes to a solution of the third technical problem, in addition to the solution of the aforementioned first, second and fourth technical problems. Specifically, the fourth device for manually dispensing medications relates to the aforementioned first device for manually dispensing medications. The fourth device for manually dispensing medications further comprises: a multitude of light-emitting units which are respectively provided to, and are associated with, the cell through holes; and a control unit configured to receive a selection of a targeted medication to be manually dispensed, and also configured to turn on, from among the light-emitting units thus provided, the light-emitting units that belong to the region to which the medication thus selected is to be manually dispensed.

A fifth device for manually dispensing medications according to the second embodiment has been proposed in order to contribute to a solution of the aforementioned fourth technical problem at an improved level. Specifically, the fifth device for manually dispensing medications relates to the aforementioned third and fourth devices for manually dispensing medications. The fifth device for manually dispensing medications further comprises a screen display unit which displays the names of medications to be manually dispensed. With such an arrangement, the control unit receives a selection made based upon the display provided by the screen display unit as a selection of the medication to be manually dispensed.

A sixth device for manually dispensing medications according to the second embodiment has been proposed in order to greatly contribute to a solution of the aforementioned third technical problem. Specifically, the sixth device for manually dispensing medications relates to the aforementioned first through fifth devices for manually dispensing medications. With such an arrangement, the open/closed switching driving means includes driving sources which are respectively provided in the form of separate components to the cell through holes.

A seventh device for manually dispensing medications according to the second embodiment has been proposed in order to solve the aforementioned fourth technical problem at an improved level. Specifically, the seventh device for manually dispensing medications is provided based upon the aforementioned third through sixth devices for manually dispensing medications. With such an arrangement, the quantity of solid medication to be inserted is indicated by the number of light-emitting units that are emitting light, or is indicated by the color of the light provided by the light-emitting unit.

With the first device for manually dispensing medications, the preliminary dispensing cassette is provided in the form of a separate component from the main unit, there by allowing the operator to detachably mount the preliminary dispensing cassette to the main unit. Accordingly, the operator can prepare a greater number of preliminary dispensing cassettes than there are main units. Such an arrangement allows the operator to dispense multiple medications in advance according to the number of preliminary dispensing cassettes thus prepared, thereby solving the first technical problem.

Furthermore, a multitude of cell through holes are formed in the part for manually dispensing medications that serves as the top face of the frame member, which is a principal component of the main unit. Here, the cell through holes are arranged in a layout that corresponds to the layout of the cells formed in the preliminary dispensing cassette. With such an arrangement, after the insertion of the preliminary dispensing cassette into the frame member, the operator can insert a medication into each cell formed in the preliminary dispensing cassette via the corresponding cell through hole formed in the part for manually dispensing medications. In addition, an open/closed switching member is included in each cell through hole. The open/closed switching members can be independently operated by the open/closed switching driving means.

Thus, such an arrangement allows the operator to transfer medications from the part for manually dispensing medications to the preliminary dispensing cassette in increments of kinds of medications. With such an arrangement, the operator distributes medications in increments of kinds of medications. Furthermore, the operator transfers the medication thus dispensed prior to the subsequent medication dispensing. With such an arrangement, the medications dispensed in different steps are not mixed, thereby allowing the operator to immediately recognize the medication thus dispensed. This solves the second technical problem.

Furthermore, such an arrangement may include the control unit according to the second device for manually dispensing medications. This provides a device for manually dispensing medications which provides a function of retaining medication that has been erroneously dispensed to an undesired region outside the region to which the medication was to be manually dispensed. This also contributes to the solution of the third technical problem.

Furthermore, the second device for manually dispensing medications has an additional function that allows a medication to be selectively dispensed by the control unit which controls the operation of each open/closed switching member, in addition to the functions of the first device for manually dispensing medications. That is to say, upon the operator selecting a targeted medication to be manually dispensed, the control unit receives the selection, and sets the region to which the medication thus selected is to be manually dispensed, based upon the prescription data etc. Subsequently, the operator inserts the medication thus selected into each of the corresponding cell through holes, there by manually dispensing the medication. Then, the operator instructs the control unit to transfer the medication, which has been manually dispensed, from the part for manually dispensing medications to the preliminary dispensing cassette positioned underneath the part for manually dispensing medications. The control unit performs a control operation such that only the open/closed switching members that belong to the region to which the medication was to be manually dispensed are switched to the open state. As a result, the medication dispensed to the correct region to which the medication was to be manually dispensed is transferred to the preliminary dispensing cassette. On the other hand, the medication erroneously dispensed to an undesired region outside the region to which the medication was to be manually dispensed is retained by the part for manually dispensing medications. Thus, such a device solves the first through third technical problems.

Furthermore, the third device for manually dispensing medications has an additional function with respect to the light-emitting units, in addition to the functions of the second device for manually dispensing medications. That is to say, when the preliminary dispensing cassette is inserted into the frame member, each cell of the preliminary dispensing cassette is associated with the corresponding light-emitting unit of the part for manually dispensing medications, in addition to the corresponding cell through hole. With such an arrangement, upon the operator selecting a targeted medication to be manually dispensed, the control unit receives the selection, and sets the region to which the medication thus selected is to be manually dispensed, based upon the prescription data etc. Then, the region to which the medication is to be manually dispensed is indicated by light-emission provided in increments of cells. Such an arrangement allows the operator to immediately recognize the region to which each medication is to be manually dispensed even though the preliminary dispensing cassette is detachably mounted. Thus, such a device solves the first through fourth technical problems.

Description will be made regarding specific arrangements for realizing such a device for manually dispensing medications according to the second embodiment of the present invention with reference to the following specific examples 2-1 and 2-2.

Figure 9A:
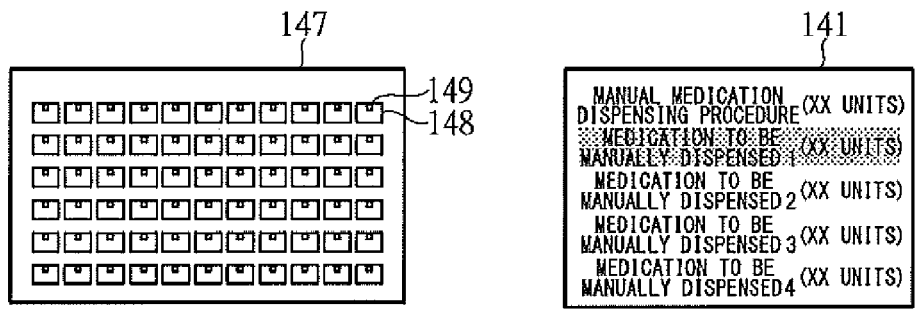
FIG. 9 shows the operation stages of the device for manually dispensing medications according to the second embodiment, wherein each of FIGS. 9A through 9D shows an example of the light-emission display and the screen display.
Figure 9B:
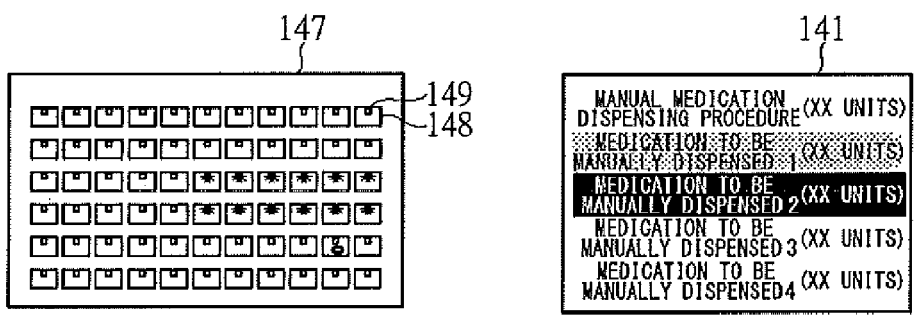
Figure 9C:
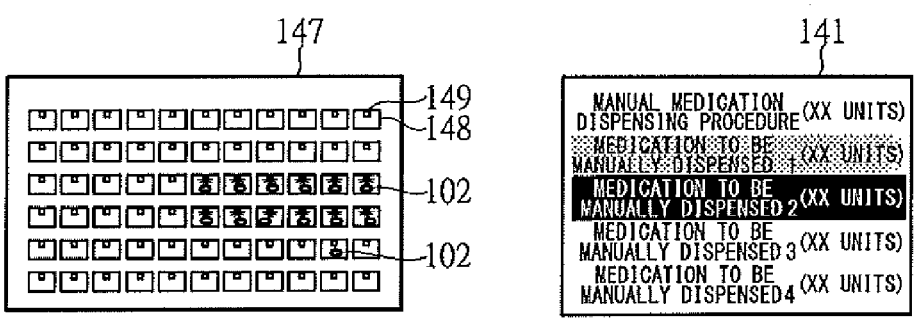
Figure 9D:
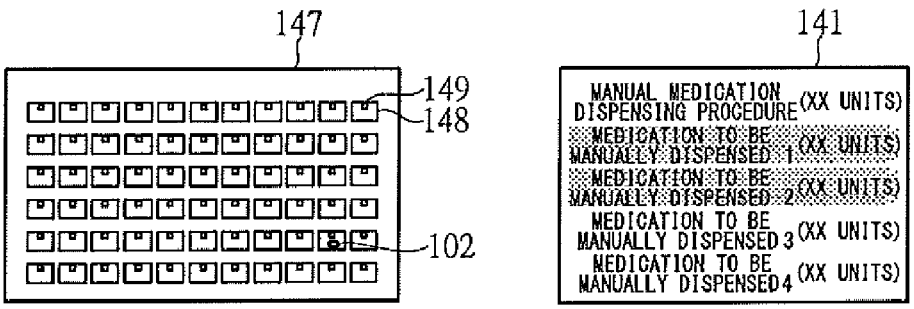
Figure 10:
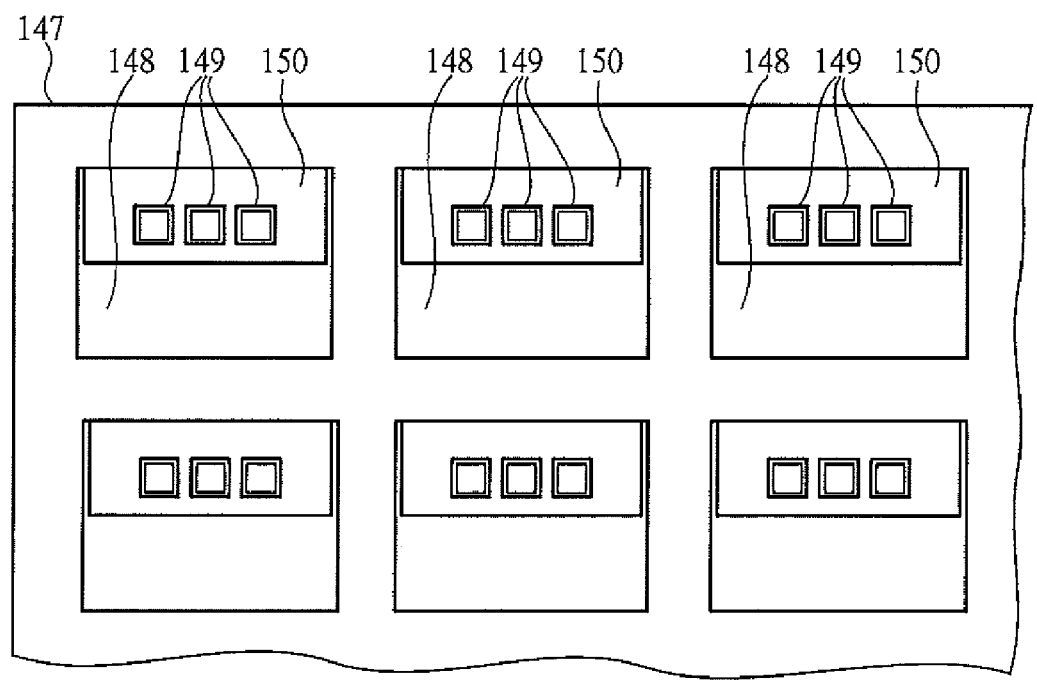
FIG. 10 is an enlarged plan view which shows the principal components provided to the part for manually dispensing medications with respect to a specific example 2-2 according to the second embodiment of the present invention, such as the cell through holes, the light-emitting units, etc.

The specific example 2-1 shown in FIGS. 6 through 9 is a specific example of the aforementioned first through sixth devices for manually dispensing medications. The specific example 2-2 shown in FIG. 10 is a specific example of the aforementioned seventh device for manually dispensing medications.

It should be noted that for simplification of explanation the drawings mainly show the components necessary for or related to explanation of the invention, and the fastening members such as bolts etc., the connecting members such as hinges etc., the electric circuits such as motor drivers, etc., are not shown in the drawings.

SPECIFIC EXAMPLE 2-1

Description will be made regarding a specific configuration of the specific example 2-1 of the device for manually dispensing medications according to the second embodiment with reference to the drawings. FIG. 6 shows a mechanical configuration of the device for manually dispensing medications. Specifically, FIG. 6A is a schematic front view which shows a medication sorting and packing system including a built-in device for manually dispensing medications 130 and a stand alone device for manually dispensing medications 140. FIG. 6B is a perspective view which shows a preliminary dispensing cassette 120 and the device for manually dispensing medications 140 (130). FIG. 6C is a perspective view which shows a cell through hole 148 formed in a part for manually dispensing medications 147 provided to a frame member 144 of a main unit 143 of the device for manually dispensing medications 140. FIGS. 6D and 6E are longitudinal cross-sectional views which show the cell through hole

Figure 7A:
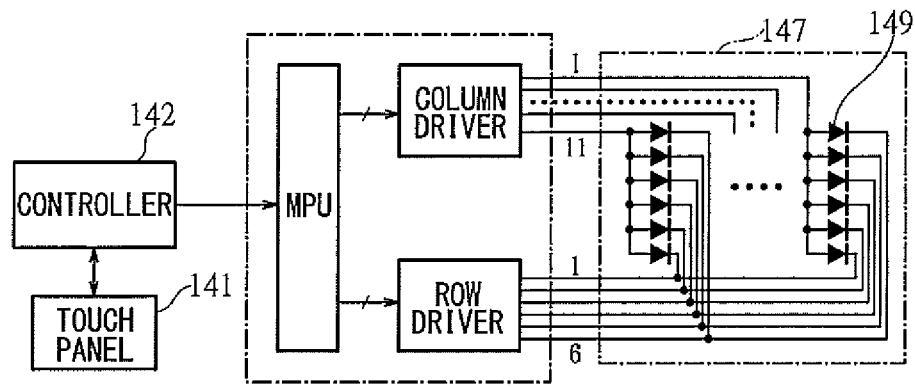
FIG. 7A is a block diagram which shows an electronic circuit thereof.
Figure 7B:
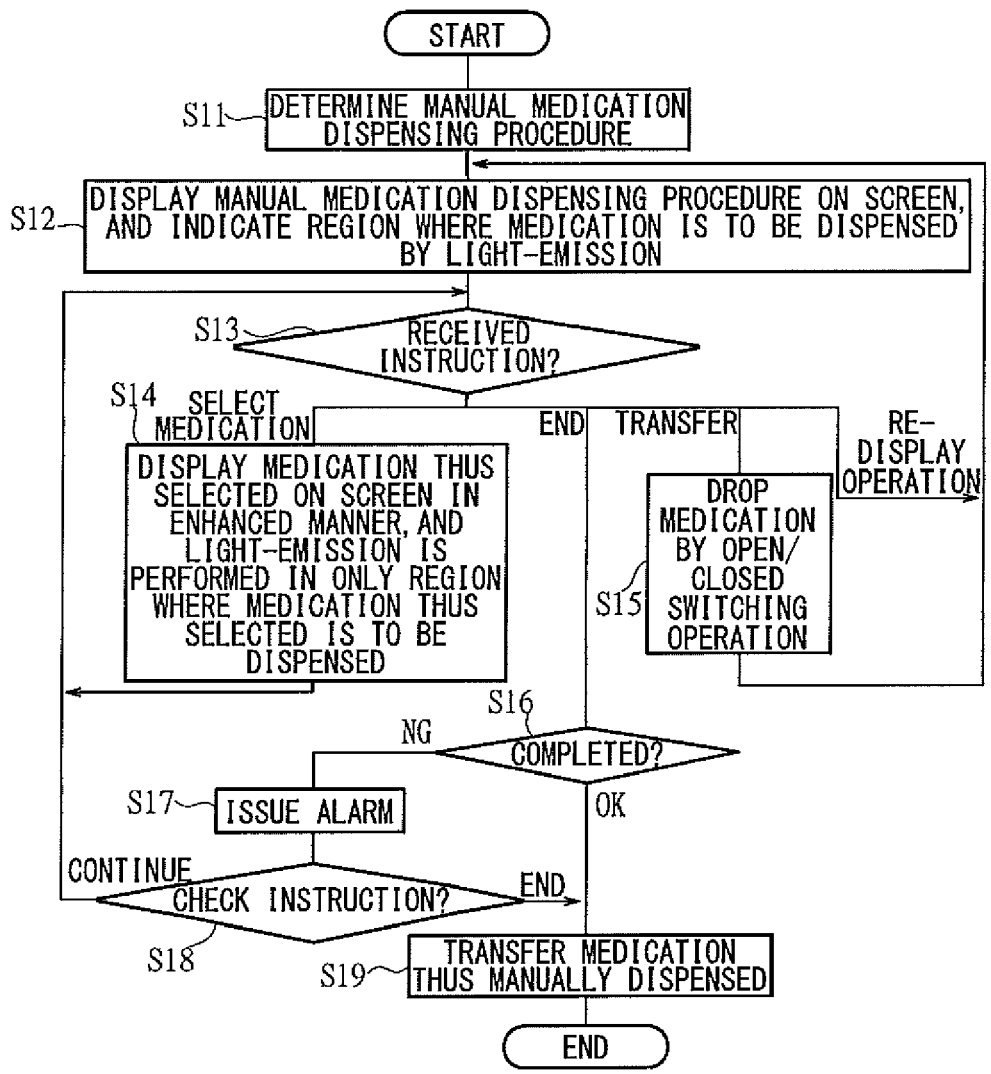
FIG. 7B is a schematic flowchart which shows the control operation thereof.

148. Here, FIG. 6D shows the cell through hole 148 in the closed state. On the other hand, FIG. 6E shows the cell through hole 148 in the open state. FIG. 7 shows the functions etc., of the device for manually dispensing medications. Specifically, FIG. 7A is a block diagram which shows an electronic circuit thereof. FIG. 7B is a schematic flowchart which shows the control operation thereof.

The pharmacy system (see FIG. 6A) employs the built-in device for manually dispensing medications 130 and the stand alone device for manually dispensing medications 140. Each of these devices for manually dispensing medications has a function of receiving prescription information (dispensing instruction data) from a host computer or the like. Here, the built-in device for manually dispensing medications 130 is provided in the form of a built-in component of the medication sorting and packing apparatus 110 in the same way as that of conventional arrangements. On the other hand, the stand alone device for manually dispensing medications 140 is provided in the form of a separate device installed on a work bench 109. For example, in order to allow medications to be automatically discharged and to be automatically sorted and packed, the medication sorting and packing apparatus 110, which is a solid medication sorting and packing machine or a solid/powdered medication sorting and packing apparatus, includes in the housing thereof: a multitude of medication feeders 111 which store various kinds of medications and which sequentially discharge these medications as necessary; a medication collecting mechanism 112 which collects the medications discharged and dropped from the medication feeders 111; a packing device 113 which packs the collected medications in a packing paper; a delivery mechanism 114 which receives the medications discharged from the device for manually dispensing medications 130 and which delivers the medications to the sorting and packing apparatus 113 via the medication collecting mechanism 112 in increments of cells. The delivery mechanism 114 has a configuration including a combination of conveyers having different feeding directions (see Patent documents 1 and 2, for example), which are disposed underneath the device for manually dispensing medications 130.

The device for manually dispensing medications 130 (see FIG. 6A) includes a main unit 133 which is capable of detachably mounting the preliminary dispensing cassette 120; a touch panel 131 which serves as an image display unit and an operating unit; and a controller 132 which serves as a control unit. The main unit 133 is mounted to the medication sorting and packing apparatus 110 through drawing rails or the like. This allows the operator to extract the main unit 133 from the housing of the medication sorting and packing apparatus 110, and to insert the main unit 133 into the housing thereof. In the state in which the main unit 133 is inserted into the housing of the medication sorting and packing apparatus 110, the main unit 133 is positioned above the delivery mechanism 114. The controller 132 is provided within the housing of the medication sorting and packing apparatus 110. The touch panel 131 is provided on the front face of the housing of the medication sorting and packing apparatus 110.

Similarly, the device for manually dispensing medications 140 includes: a main unit 143 which detachably mounts the preliminary dispensing cassette 120; a touch panel 141 which serves as an image display unit and an operating unit; and a controller 142 which serves as a control unit. The device for manually dispensing medications 140 is configured such that it can be installed on a desk or the like.

The configurations of the devices for manually dispensing medications 130 and 410 may be the same, except for the difference according to their respective types, i.e., the built-in type or the stand alone type. For example, the main unit 133 of the built-in type device for manually dispensing medications 130 is formed in the shape of a thin plate, giving priority to the compact mounting thereof. On the other hand, the main unit 143 of the stand alone type device for manually dispensing medications 140 is formed with an inclined upper face, giving priority to the ease-of-use of the operator who performs the manual medication dispensing. However, such a difference there between is not essential.

The preliminary dispensing cassette 120 (see the left side of FIG. 6B) has a structure that allows the operator to detachably mount it to either of the devices for manually dispensing medications 130 or 140, and that allows the operator to separate it from the devices for manually dispensing medications 130 and 140. Furthermore, the preliminary dispensing cassette 120 is partitioned so as to have a multitude of cells 121 in the form of a 6×11 matrix, for example. Each cell 121 has a structure in which the top face is open, which allows medications to be inserted, and the bottom face/underside thereof has a shutter mechanism or the like which provides a function of opening/closing the underside, thereby allowing the medications to be discharged. With such an arrangement, the undersides of the cells 121 are opened all at once or sequentially in combination with the operation of the delivery mechanism 114. An information medium 122 is attached to the preliminary dispensing cassette 120, which notifies the operator of the medications to be manually dispensed to the cells 121, etc. Specifically, the information medium 122 is provided in the form of a barcode label that specifies the identification number of the procedure for manually dispensing medications or in the form of a data carrier which stores the content of the procedure for manually dispensing medications.

The main unit 143 (see the right side of FIG. 6B) of the device for manually dispensing medications 140 has the same structure as that of the main unit 133 of the device for manually dispensing medications 130. Specifically, the main unit 143 is principally formed of the box-shaped frame member 144 which allows the operator to insert/extract the preliminary dispensing cassette 120 to/from the main unit 143. In this example, the main unit 143 is connected via a cable to the controller 142 provided in the form of a separate unit.

The frame member 144 is provided in the form of a frame that surrounds a cassette storage space 145 that is capable of completely storing the preliminary dispensing cassette 120. The frame member 144 has an upper face that is sufficiently open so as to allow the operator to insert/extract the preliminary dispensing cassette 120 via the upper face. On the other hand, the frame member 144 has a closed underside, or an underside having an open area that is smaller than that of the preliminary dispensing cassette 120, there by supporting the preliminary dispensing cassette 120 stored in the cassette storage space 145. The frame member 144 may have such an open underside as an option. On the other hand, the frame member of the main unit 133 of the device for manually dispensing medications 130 must have an open underside structure, which is not an option. The frame 144 includes an information read out device 146, which accesses the information medium 122, at a position that faces the information medium 122 when the preliminary dispensing cassette 120 is stored in the frame member 144. Examples of the devices which can be employed as the information readout device 146 include: a barcode reader and/or barcode writer; a data access device; etc.

The part for manually dispensing medications 147 (see the right side of FIG. 6B) is formed in the shape of a plate with a size that occupies the most part of the upper face of the frame member 144. In this example, the part for manually dispensing medications 147 is fit into and fixed to the inclined surface of the frame member 144. The part for manually dispensing medications 147 has a multitude of cell through holes 148 with the same layout as that of the cells 121 formed in the preliminary dispensing cassette 120. Each cell through hole 148 serves as an insertion opening which allows the operator to manually insert medications. When the preliminary dispensing cassette 120 is stored in the cassette storage space 145 of the frame member 144, each cell 121 is positioned underneath a corresponding cell through hole 148 such that the cells 121 are each associated with a respective cell through hole 148. The part for manually dispensing medications 147 includes a multitude of light-emitting units 149 and open/closed switching mechanisms 150 through 153. Specifically, the light-emitting unit 149 and the open/closed switching mechanisms 150 through 153 are provided within each cell through hole 148 (see FIG. 6C).

Each light-emitting unit 149 comprises an LED (light-emitting diode) which is capable of independently emitting light. The light-emitting units 149 are arranged such that they are each associated with a respective cell through hole 148. In this example (see FIG. 6C), each light-emitting unit 149 is mounted on the inside wall of the rear side of the cell through hole 148, thereby facilitating the operator's ability to recognize the light-emission state of the light-emitting unit 149. Furthermore, each light-emitting unit 149 is provided behind an inclined plate 150, which protects each component from being damaged by medication inserted via the cell through hole 148 dropping on the aforementioned components, and which prevents the cell through hole 148 from being blocked with the medication thus inserted. Moreover, each inclined plate 150 is formed of a transparent or translucent plate, thereby allowing the operator to clearly visually recognize the light-emission state of each light-emitting unit 149, even though the light-emitting unit 149 is provided behind the inclined plate 150. In addition, the inclined plate 150 may have a light diffusion property (light scattering property). With such an arrangement, the entire area of the inclined plate 150 is illuminated when the light-emitting unit 149 is turned on. This further facilitates the operators ability to visually recognize the light-emission state of the light-emitting unit 149.

The open/closed switching mechanisms 150 to 153 (see FIG. 6C) comprise: an open/closed switching member 151 such as a shutter plate supported immediately underneath the inclined plate 150 such that it can be swung; a driving source 152 such as a motor or the like also provided underneath the inclined plate 150; and a cantilever-like support member 153 which is mounted to the output rotor of the motor. With such an arrangement, when the support member 153 is moved forward (the left side in FIG. 6D) by the operation of the driving source 152, the open/closed switching member 151 is moved upward such that it extends approximately in the horizontal direction, thereby closing the intermediate portion of the cell through hole 148. On the other hand, when the supporting member 153 is moved backward (the right side in FIG. 6E) by the operation of the driving source in the reverse direction, the open/closed switching member 151 moves downward and retracts, thereby opening the cell through hole 148. Furthermore, the controller 142 independently controls each driving source 152, thereby allowing the open/closed switching members 141 to be operated sequentially in increments of open/closed switching members 141, and to be operated all at once.

The touch panel 141 (see FIG. 6B) may be a general-purpose touch panel having a configuration in which an input unit is provided to a liquid crystal panel. The touch panel 141 serves as a screen display unit having a function of displaying the name of each medication and the quantity of solid medication to be dispensed according to the procedure for manually dispensing medications. Also, the touch panel 141 serves as an operating unit which allows the operator to select a medication via the touch panel 141 from among the medication names thus displayed.

The controller 142 (see FIG. 6B) comprises a programmable microprocessor system, for example. Upon reception of the content of procedure for manually dispensing medications from a host computer or the like, the controller 142 instructs the touch panel 141 to display the name of the medication and the quantity of solid medication to be dispensed as specified by the procedure for manually dispensing medications. Furthermore, when the operator performs a selection operation at the portion of the touch panel 141 at which the medication name is displayed, the controller 142 receives the selection information that corresponds to this portion of the touch panel 141. Also, the controller 142 may instruct a lower microprocessor (MPU), a row driver, a column driver, etc., to perform a dynamic driving operation in a time-sharing manner (see FIG. 7A). Such an arrangement allows a desired light-emission unit 149 from among the multitude of light-emission units 149 to be turned on.

The light-emission units 149 can be turned on over the entire region where the medications are to be dispensed according to the procedure for manually dispensing medications. Also, the light-emission units 149 can be turned on only over the region to which a selected medication is to be dispensed, according to the selection of the medication name. Accordingly, the program for the controller 142 provides the following instructions (see FIG. 7B). That is to say, upon reception of prescription data from the host computer, for example, the controller 142 queries the medication sorting and packing apparatus 110 with regard to whether or not each medication to be dispensed is stored in the medication sorting and packing apparatus 110, and the controller 142 determines the procedure for manually dispensing medications (Step S1). Then, the controller 142 displays the content of the procedure for manually dispensing medications on the screen of the touch panel 141, and turns on the light-emission units 149 that correspond to the region where the medications are to be dispensed (Step S12). In this stage, the medication name and the quantity of solid medication to be dispensed are displayed on the screen for each of the medications specified in the procedure for manually dispensing medications. The light-emission units 149 are turned on over the entire region where at least one kind of medication is to be manually dispensed. On the other hand, the light-emission units 149 that belong to the other region are turned off.

Next, the controller 142 waits for the operators instruction operation to be performed via the touch panel 141 or the like (Step S13). Upon reception of the instruction to select a medication (Step S14), the medication name of the medication thus selected is highlighted on the touch panel 141, as reversed-out text, for example, and the region where the light-emission units 149 are turned on is limited to a region where the medication thus selected is to be dispensed, whereupon the flow returns to the processing in which the controller 142 waits for an instruction (Step S13). It should be noted that, upon reception of a re-display instruction in the step in which the control unit 142 waits for the instruction, the control unit 142 turns on the light-emission units 149 again over the entire region where at least one kind of medication is to be manually dispensed.

On the other hand, upon reception of a medication transfer instruction in the step (Step S13) in which the controller 142 waits for the operator's instruction, the controller 142 operates the driving sources 152 provided to the cell through holes 148 where the light-emitting units 149 are turned on, there by switching the corresponding open/closed switching members 151 to the open state (Step S15). In this stage, if a medication has been selected, the controller 142 switches to the open state only the open/closed switching members 151 that belong to the region where the medication thus selected is to be dispensed. In this example, following this operation, the controller 142 turns off the light-emitting units 149.

Upon reception of an instruction to end the process in the step (Step S13) in which the control unit 142 waits for an instruction, the controller 142 checks whether or not all the medications specified in the procedure for manually dispensing medications have been selected (Step S16). In a case in which there is any medication that has not been selected (in a case of "NG" in Step S16), the controller 142 issues an alarm (Step S17), which allows the operator manually dispensing medications to determine whether or not the process should be ended (Step S18). Upon reception of an instruction to continue the process, the flow returns to the processing in which the controller 142 waits for an instruction (Step S13). On the other hand, in a case in which the controller 42 has received an instruction to end the process (in a case of "END" in Step S18), or in a case in which determination has been made that all the medications have been selected (in a case of "OK" in Step S16), the controller 42 transmits the identification number and/or the content of the procedure for manually dispensing medications to the information medium 122 (Step S19).

Description will be made regarding the uses and the operations of the devices for manually dispensing medications 130 and 140 according to the specific example 2-1 with reference to the drawings. FIG. 6A shows a stage in which the operator preliminarily manually dispenses medications using the medication sorting and packing apparatus 110 including the built-in device for manually dispensing medications 130 and the stand alone device for manually dispensing medications 140. FIG. 6B shows the step in which the preliminary dispensing cassette 120 is inserted into the device for manually dispensing medications 140. Each of FIGS. 8A through 8D and FIGS. 9A through 9D shows the illumination display using the light-emission units 149 provided to the part for manually dispensing medications 147 and the screen display on the touch panel 141.

First, description will be made regarding the outline of the process initially performed according to several medication prescriptions to be dispensed manually (see FIG. 6A). Next, description will be made regarding the process according to a procedure for manually dispensing medications that specifies large quantities of multiple medications (see FIGS. 6B, FIG. 8, and FIG. 9).

First, let us say that each medication feeder 11 has been replenished with the corresponding medication, and the medication sorting and packing apparatus 110 is ready to automatically dispense medication (see FIG. 6A). Furthermore, let us say that the host computer receives prescriptions, a part of which specifies medications that are not stored in any medication feeder 111. These prescriptions are transmitted from the host computer to the medication sorting and packing apparatus 110. The part of the prescriptions that specifies the medications that are not stored in any medication feeder 11 is extracted in the form of a procedure for manually dispensing medications by the host computer or the medication sorting and packing apparatus 110. The procedure for manually dispensing medications thus extracted is also transmitted to the device for manually dispensing medications 140. Thus, such an arrangement allows the operator to perform the manual medication dispensing operation using either the device for manually dispensing medications 130 or 140. When the operator starts the process of dispensing medications manually using one device for manually dispensing medications selected from among the dispensing devices 130 and 140, the procedure for manually dispensing medications is discarded for the device for manually dispensing medications that has not been selected for use by the operator. This avoids duplication in the procedure for manually dispensing medications.

In a typical operation procedure, the operator performs the manual medication dispensing operation according to the first procedure for manually dispensing medications using the device for manually dispensing medications 130 included in the medication sorting and packing apparatus 110. After all the medications have been sent to the delivery member 114 or the like according to the first procedure for manually dispensing medications, the operator performs a manual medication dispensing operation according to the second procedure for manually dispensing medications using the device for manually dispensing medications 130 in the same way as with the first procedure for manually dispensing medications. In this stage, the device for manually dispensing medications 130 is busy until the medication sorting and packing apparatus 110 performs automatic medication dispensing according to the medication prescription that specifies these medications. Accordingly, the operator performs the procedures for manually dispensing medications according to the third and subsequent procedures for manually dispensing medications using the device for manually dispensing medications 140. Before the operator performs the manual medication dispensing operation using the device for manually dispensing medications 140, the operator must replace the preliminary dispensing cassette 120 in increments of completed procedures. The preliminary dispensing cassette 120 that has been subjected to the preliminary dispensing is kept as appropriate in a rack or the like formed in a workbench 109, until the operator can mount the preliminary dispensing cassette 120 to the medication sorting and packing apparatus 110.

Upon reception of a request from the medication sorting and packing apparatus 110 to perform the next manual medication dispensing operation, the operator extracts the used preliminary dispensing cassette 120 from the device for manually dispensing medications 130, and replaces it with a new preliminary dispensing cassette 120 to which medications have been manually dispensed. In this stage, the procedure for manually dispensing medications is checked using the information medium 122. If the procedure for manually dispensing medications matches the information specified in the information medium 122, the medication sorting and packing apparatus 110 immediately performs automatic medication dispensing. On the other hand, if the procedure for manually dispensing medications does not match the information specified in the information medium 122, before the medication sorting and packing apparatus 110 performs automatic medication dispensing, the medication sorting and packing apparatus 110 changes the order of the process for manually dispensing medications specified in the prescription (see Patent document 2) for example).

Thus, such an arrangement allows the operator to perform preliminary manual medication dispensing operations according to the procedures for manually dispensing medications, even if there are a multitude of procedures for manually dispensing medications. Such an arrangement reduces the idle time of the medication sorting and packing apparatus 110 to approximately zero.

Next, let us say that, in at least one from among the manual medication dispensing operations, the corresponding procedure for manually dispensing medications specifies large quantities of multiple medications (see FIGS. 6B and 8, and FIG. 9). In this case, such an arrangement using the device for manually dispensing medications 140 allows the operator to perform the same operations as described above, except for the addition of the operations of extracting/inserting the main unit 133. Description will be made below regarding the operations.

Figure 8A:
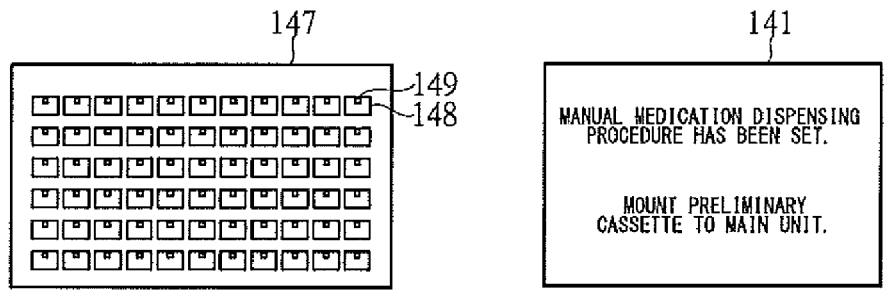
FIG. 8 shows the operation stages of the device for manually dispensing medications according to the second embodiment, wherein each of FIGS. 8A through 8D shows an example of the light-emission display and the screen display.

First, a guide screen is displayed on the touch panel 141, which prompts the operator to perform the manual medication dispensing operation (see FIG. 8A). According to this instruction, the operator manually dispensing medications prepares an empty preliminary dispensing cassette 120. Furthermore, the operator inserts the empty preliminary dispensing cassette 120 into the cassette storage space 145 of the main unit 143 (see FIG. 6B). In this stage, in the part for manually dispensing medications 147 (see FIG. 8A) of the main unit 143 of the device for manually dispensing medications 140, all the open/closed switching members 151 are closed, and all the cell through holes 148 have thereby been switched to the closed state. At the same time, all the light-emitting units 149 are turned off.

Figure 8B:
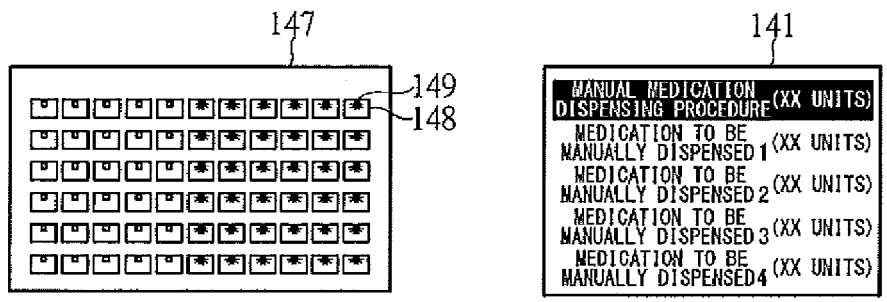
Figure 8C:
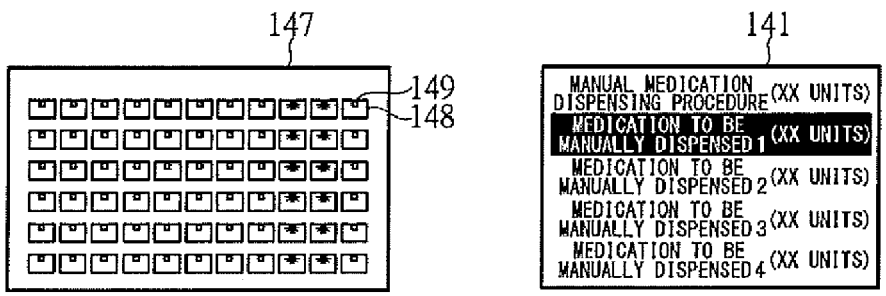
Figure 8D:
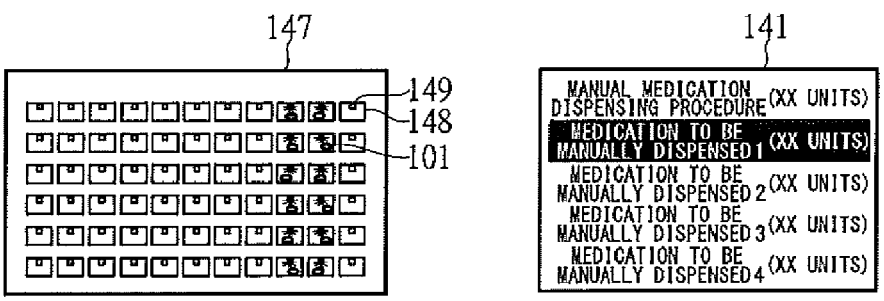

After the preliminary dispensing cassette 120 is completely inserted into the main unit 143, the device for manually dispensing medications 140 automatically displays the content of the procedure for manually dispensing medications on the screen of the touch panel 141 (see FIG. 8B). First, the device for manually dispensing medications 140 displays the identification information with regard to the procedure for manually dispensing medications, the total quantity of solid medication to be dispensed, etc., in a highlighted manner using black-and-white reversed-out text or colored text. On the other hand, the device for manually dispensing medications 140 displays the name of each medication and the quantity of each medication to be dispensed in a normal display manner. Furthermore, at the part for manually dispensing medications 147, the light-emitting units 149 are turned on over the region where at least one kind of medication is to be dispensed (6×6 matrix on the right side in FIG. 8B). In this stage, when the operator manually dispensing medications selects via the touch panel 141 the medication 101 to be manually dispensed, the highlighted area is moved to the area where the medication name thus selected and the quantity thereof to be dispensed are displayed (see FIG. 8C). At the same time, the light emission of the light-emitting units 149 is limited to the area to which the medication thus selected is to be dispensed (the second and third rows from the right side, each of which corresponds to six cells, in FIG. 8C). The operator manually dispensing medications inserts the medication 101, which is to be manually dispensed, into each cell through hole 148 while observing the light-emission pattern.

After the medication 101 is manually dispensed to the region to which this medication is to be dispensed, the operator manually dispensing medications operates the touch panel 141 so as to instruct the device for manually dispensing medications 140 to transfer the medication 101 thus manually dispensed. Upon reception of this instruction, the device for manually dispensing medications 140 opens only the open/closed switching members 151 provided in the cell through holes 148 formed in the part for manually dispensing medications 147 that belong to the region to which the medication 101 was to be dispensed. This permits the medication 101 to drop into the corresponding cells 121 formed in the preliminary dispensing cassette 120 through the cell through holes 148 formed in the part for manually dispensing medications 147. In this stage, if the region to which the medication 101 has been manually dispensed matches the correct region to which the medication 101 was to be dispensed, the medication 101 is not retained in the part for manually dispensing medications 147 (see FIG. 9A). At the same time, the light-emitting units 149, which are provided to the cell through holes 148 formed in the part for manually dispensing medications 147, are turned off. Furthermore, on the display screen of the touch panel 141, the display state is changed with respect to the medication 101, which notifies the operator that the process for manually dispensing the medication 101 has been completed.

Subsequently, after the operator has confirmed that there is no medication 101 remaining in the part for manually dispensing medications 147, the operator manually dispensing medications selects via the touch panel 141 the medication 102 that is to be manually dispensed, whereupon the highlighted area is moved to the area where the name of the medication 102 and the quantity thereof to be dispensed are displayed (see FIG. 9B). At the same time, the light emission of the light-emitting units 149 is limited to the area to which the medication 102 thus selected is to be manually dispensed (the third and fourth lines, each of which corresponds to six cells starting from the right side, in FIG. 9B). The operator manually dispensing medications inserts the medication 102, which is to be manually dispensed, into each cell through hole 148 while observing the light-emission (see FIG. 9C.

With such an arrangement, the operator repeatedly performs the above-described operations, thereby allowing the operator to easily and precisely distribute each medication manually. Furthermore, in a case in which the operator has erroneously inserted a medication into a cell through hole 148 outside the region to which the medication was to be manually dispensed, such an arrangement allows the operator to recognize such an undesired situation as described below. This ensures that there is no chance of the operator failing to notice such an undesired situation.

That is to say, after the medication 102 has been manually dispensed, the operator manually dispensing medications operates the touch panel 141 so as to transmit an instruction to transfer the medication thus manually dispensed. Upon reception of this instruction, the device for manually dispensing medications 140 only operates the open/closed switching members 151 that belong to the region to which the medication 102 was to be dispensed. Accordingly, the medication 102 is transferred to the cells 121 formed in the preliminary dispensing cassette 120 only via the cell through holes 148 that belong to the region to which the medication 102 was to be dispensed. In this stage, no medication 102 remains in the cell through holes 148 that belong to the region of the part for manually dispensing medications 147 where the medication 102 was to be manually dispensed. On the other hand, if the operator has dispensed the medication 102 to an undesired region outside the region to which the medication 102 was to be dispensed, the medication 102 thus erroneously dispensed is retained in the part for manually dispensing medications 147 (see FIG. 9D). Thus, such an arrangement allows the operator to immediately recognize such an undesired situation. Thus, the operator can remove such medication 102 that has been dispensed to an undesired location before the next step for manually dispensing medications.

As described above, each of the devices for manually dispensing medications 130 and 140 according to the present invention permits the operator to perform the manual medication dispensing operation while checking the dispensing results for each medication transfer step. Thus, such an arrangement allows the operator to perform at a high speed and in a sure manner.

Furthermore, if the operator instructs the device for manually dispensing medications 140 to perform the re-display operation, the state of the screen display of the touch panel 141 and the state of the light emission of the light-emitting units 149 are returned to their initial states. In this stage, the light-emitting units 149 are turned on over the entire area to which at least one kind of medication is to be dispensed, thereby allowing the operator to easily recognize the entire area to which at least one kind of medication is to be dispensed. Also, if the operator instructs the device for manually dispensing medications 140 to end the process before all the medications are dispensed, the device for manually dispensing medications 140 issues an alarm and requests that the operator check this instruction. Such an arrangement prevents the omission of any of the steps in the manual medication dispensing operation.

Upon completion of the manual medication dispensing operation according to a procedure for manually dispensing medications, the device for manually dispensing medications 140 writes the information with respect to the procedure for manually dispensing medications to the information medium 122 of the preliminary dispensing cassette 120, whereupon the preliminary dispensing cassette 120 enters the state in which the operator can extract it from the device for manually dispensing medications 140.

SPECIFIC EXAMPLE 2-2

Description will be made regarding specific components of the specific example 2-2 of the device for manually dispensing medications according to the second embodiment with reference to the drawing. FIG. 10 is an enlarged plan view which shows the principal components provided to the part for manually dispensing medications 147, such as the cell through holes 148, the light-emitting units 149, etc.

The difference between this device for manually dispensing medications and the above-described specific example 2-1 is as follows. First, in the device for manually dispensing medications according to the specific example 2-2, each cell through hole 148 includes an increased number of light-emitting units 149 (i.e., three light-emitting units 149). Second, in the step in which the light-emitting units 149 provided to the cell through holes 148 are turned on, which indicates the region to which a medication is to be dispensed, for each cell through hole 148 the same number of light-emitting units 149 as the quantity of solid medication to be inserted are turned on.

It should be noted that, if the quantity of solid medication to be inserted is greater than the number of light-emitting units 149 for each cell through hole 148, this process is divided into more than one part.

Such an arrangement allows the operator to easily recognize in a sure manner the quantity of solid medication that have been inserted, by checking the number of light-emitting units 149 that are emitting light. With such an arrangement, the light-emitting units 149 are mounted to the front face of each inclined plate 150, thereby allowing the operator to directly observe the light-emitting units 149. This allows the operator to clearly recognize the number of light-emitting units 149 that are emitting light.

Also, an arrangement may be made in which colored LEDs are employed as the light-emitting units 149, and the quantity of solid medication that have been inserted is indicated by the color provided by the light-emitting units 149, for example, which is not shown in the drawings. With such an arrangement, each light-emitting unit 149 may be provided behind the inclined plate 150. Also, the inclined plate 150 may be formed of a light-scattering plate.

Other

Description has been made regarding an arrangement in which the touch panels 131 and 141 are employed, each of which has a configuration in which the screen display unit and the operating unit are integrated. Also, an arrangement may be made in which the screen display unit and the operating unit are provided in the form of separate units. For example, the screen display unit and the operating unit may be provided in the form of a display, a keyboard, and a mouse. Also, the control unit is not restricted to a microprocessor. The control unit may comprise a so-called notebook-sized personal computer having a configuration in which the screen display unit and the operating unit are integrated. Also, the control unit may comprise a so-called desktop computer having a configuration in which the screen display unit and the operating unit are provided as separate units. Also, all of, or desired components selected from among, the control unit, the screen display unit, and the operating unit may be provided in the form of built-in components of the main unit.

Description has been made in the above-described specific examples regarding an arrangement which allows the operator to select a medication to be manually dispensed, by operating the touch panel 141 that provides the screen display. Also, an arrangement may be made which has a function of reading out a barcode or the like attached to the medication storage container, thereby selecting the medication to be manually dispensed.

Description has been made in the specific examples regarding an arrangement which allows the operator to directly insert/extract the preliminary dispensing cassette 120 into/from the cassette storage space 145 formed in the main unit 143 of the device for manually dispensing medications 140. Also, an arrangement may be made including a drawer member, which comprises a drawer box, rails, etc., mounted to the frame member 144 of the main unit 143, thereby allowing the operator to insert/extract the preliminary dispensing cassette 120 into/from the cassette storage space 145 via the drawer member thus provided. Also, the present invention is not restricted to an arrangement in which the insertion/extraction portion for the preliminary dispensing cassette 120 is provided to the front face of the frame member 144. Also, the insertion/extraction portion for the preliminary dispensing cassette 120 may be provided on the left side face, the right side face, or the top face. With an arrangement that allows the operator to insert/extract the preliminary dispensing cassette 120 via the top face of the frame 144, the part for manually dispensing medications 147 should be provided in the form of a lid that allows the operator to open/close the top face of the frame member 144, thereby allowing the operator to insert/extract the preliminary dispensing cassette 120 via the top face thus opened.

INDUSTRIAL APPLICABILITY

As described above, the present invention can be applied to a device for manually dispensing medications which allows the operator to manually dispense a medication in advance to a multitude of cells.

The invention claimed is:

1. A device for manually dispensing medications to a preliminary dispensing cassette for use in a medication sorting and packing apparatus, comprising:
   a frame member which allows an operator to insert/extract the preliminary dispensing cassette therein, via the front face thereof, the preliminary dispensing cassette is partitioned into a multitude of cells;
   a part for manually dispensing medications provided as one of a built-in member of a top face of the frame member or a lid that allows the operator to open/close the top face of said frame member, the part for manually dispensing medications has a multitude of cell through holes formed with a layout that matches a layout of the cells provided to said preliminary dispensing cassette;
   a multitude of open/closed switching members respectively provided within said cell through holes; and
   an open/closed switching driving means which drives said open/closed switching members independently of one another,
   wherein each of the open/closed switching members is configured to hold thereon a medication inserted into a corresponding cell through hole when closed and allow the medication to drop into a corresponding cell of the preliminary dispensing cassette when opened.

2. A device for manually dispensing medications according to claim 1, further comprising a control unit configured to receive a selection of a targeted medication to be manually dispensed, such that the targeted medication is transferred downward from said part for manually dispensing medications when said open/closed switching members are opened for only a region to which the targeted medication thus selected is to be manually dispensed.

3. A device for manually dispensing medications according to claim 2, wherein said light-emitting units are respectively provided to and associated with said cell through holes,
   and wherein, when said control unit prompts the operator to manually dispense the targeted medication to said part for manually dispensing medications, said control unit turns on, from among said light-emitting units thus provided, the light-emitting units that belong to the region to which the targeted medication thus selected is to be manually dispensed.

4. A device for manually dispensing medications according to claim 1, further comprising:
   a multitude of light-emitting units which are respectively provided to, and are associated with, said cell through holes; and
   a control unit configured to receive a selection of a targeted medication to be manually dispensed, and also configured to turn on, from among said light-emitting units thus provided, the light-emitting units that belong to a region to which the targeted medication thus selected is to be manually dispensed.

5. A device for manually dispensing medications according to claim 3, further comprising:
   a screen display unit which displays the names of medications to be manually dispensed,
   wherein said control unit receives a selection made based upon the display provided by said screen display unit as a selection of the targeted medication to be manually dispensed.

6. A device for manually dispensing medications according to claim 1, wherein said open/closed switching driving means includes driving sources which are respectively provided as separate components to said cell through holes.

7. A device for manually dispensing medications according to claim 4, further comprising:
   a screen display unit which displays the names of medications to be manually dispensed,
   wherein said control unit receives a selection made based upon the display provided by said screen display unit as a selection of the targeted medication to be manually dispensed.

8. A device for manually dispensing medications according to claim 2, wherein said open/closed switching driving means includes driving sources which are respectively provided as separate components to said cell through holes.

9. A device for manually dispensing medications according to claim 3, wherein said open/closed switching driving means includes driving sources which are respectively provided as separate components to said cell through holes.

10. A device for manually dispensing medications according to claim 4, wherein said open/closed switching driving means includes driving sources which are respectively provided as separate components to said cell through holes.

11. A device for manually dispensing medications according to claim 5, wherein said open/closed switching driving means includes driving sources which are respectively provided as separate components to said cell through holes.

* * * * *